(12) United States Patent
Staack et al.

(10) Patent No.: US 12,116,533 B2
(45) Date of Patent: Oct. 15, 2024

(54) EFFICIENT CIRCUIT IN PULSED ELECTRICAL DISCHARGE PROCESSING

(71) Applicant: The Texas A&M University System, College Station, TX (US)

(72) Inventors: David Staack, College Station, TX (US); Christopher Campbell, College Station, TX (US); Matthew Burnette, College Station, TX (US); Nicholas Gawloski, College Station, TX (US)

(73) Assignee: THE TEXAS A&M UNIVERSITY SYSTEM, College Station, TX (US)

( * ) Notice: Subject to any disclaimer, the term of this patent is extended or adjusted under 35 U.S.C. 154(b) by 724 days.

(21) Appl. No.: 17/048,640

(22) PCT Filed: Apr. 19, 2019

(86) PCT No.: PCT/US2019/028335
§ 371 (c)(1),
(2) Date: Oct. 19, 2020

(87) PCT Pub. No.: WO2019/204736
PCT Pub. Date: Oct. 24, 2019

(65) Prior Publication Data
US 2023/0050244 A1 Feb. 16, 2023

Related U.S. Application Data

(60) Provisional application No. 62/660,694, filed on Apr. 20, 2018.

(51) Int. Cl.
*C10G 15/08* (2006.01)
*B01J 19/08* (2006.01)

(52) U.S. Cl.
CPC ............ *C10G 15/08* (2013.01); *B01J 19/088* (2013.01); *B01J 2219/00049* (2013.01); *B01J 2219/0809* (2013.01); *B01J 2219/0815* (2013.01)

(58) Field of Classification Search
CPC ........ C10G 15/08; C10G 15/12; C10G 47/00; B01J 19/088; B01J 2219/00049;
(Continued)

(56) References Cited

U.S. PATENT DOCUMENTS

2005/0116690 A1   6/2005   Adachi
2009/0085491 A1*  4/2009   Siessegger ......... H05B 41/2881
                                              315/209 M
(Continued)

FOREIGN PATENT DOCUMENTS

EA     201690043 A1    7/2016
GB     1 905 03594 A   6/1905
(Continued)

OTHER PUBLICATIONS

Examination Report on GC Patent Application No. 2019/37415 dated May 14, 2020 (3 pages).
(Continued)

*Primary Examiner* — Xiuyu Tai
(74) *Attorney, Agent, or Firm* — Foley & Lardner LLP

(57) ABSTRACT

Disclosed are example efficient circuits that produce spark discharges for hydrocarbon conversion (or treatment of other mixtures) using a high-voltage rectified DC supply to discharge a capacitor (either internal or external) across a two-electrode gap, optimized to minimize waste energy by operating in a constant current, approximately-constant current, or constant power mode. The circuits may operate off of a standard electrical supply line (e.g. 120 VAC or 240 V AC, 60 Hz, single-phase or multi-phase). The disclosed
(Continued)

approach is scalable to any number of discharge gaps while maintaining similar pulse characteristics and electrical efficiency.

18 Claims, 30 Drawing Sheets

(58) Field of Classification Search
CPC ........ B01J 2219/0809; B01J 2219/0815; B01J 19/087; B01J 2219/00164; B01J 2219/0024; B01J 2219/00202; B01J 2219/083; B01J 2219/0877; B01J 2219/0816; B01J 2219/082; B01J 2219/002; B01J 2219/00063; B01J 2219/0828; H05H 1/247; H05H 1/26; H01T 4/10; H01T 4/16; H01T 11/00; H01T 14/00; H01T 15/00; F23Q 3/00; F23Q 5/00

See application file for complete search history.

(56) References Cited

U.S. PATENT DOCUMENTS

| | | |
|---|---|---|
| 2015/0256927 A1 | 9/2015 | Wood et al. |
| 2016/0177190 A1 | 6/2016 | Novoselov |
| 2016/0207801 A1 | 7/2016 | Stronczek |

FOREIGN PATENT DOCUMENTS

| | | |
|---|---|---|
| IN | 2453/CHENP/2004 | 9/2007 |
| WO | WO-2017/173028 A1 | 10/2017 |
| WO | WO-2017/173112 | 10/2017 |

OTHER PUBLICATIONS

International Search Report and Written Opinion in International Patent Application No. PCT/US2019/028335 dated Aug. 16, 2019 (12 pages).

\* cited by examiner

EFFICIENT CIRCUIT IN PULSED ELECTRICAL DISCHARGE PROCESSING

CROSS REFERENCE TO RELATED APPLICATION

This application is a U.S. National Stage Application under 35 U.S.C. § 371 of International Patent Application No. PCT/US2019/028335, filed on Apr. 19, 2019, which claims priority to U.S. Provisional Patent Application No. 62/660,694 entitled "EFFICIENT CIRCUIT IN PULSED ELECTRICAL DISCHARGE PROCESSING," filed Apr. 20, 2018, each of which is herein incorporated by reference in its entirety for all purposes.

FIELD

The present technology generally relates to high-efficiency electrical spark discharge circuit for use in economically converting heavy liquid hydrocarbons to lighter products.

BACKGROUND

The oil and gas industry is divided into three chronological sectors: upstream, midstream, and downstream. The upstream sector involves the exploration and production section. It involves searching, producing, and recovering crude oil and/or natural gas from underground or underwater fields. It also covers the process of drilling and operation of wells that recover and bring crude oil and raw gas to the surface. The exploration includes conducting geological and geophysical surveys, searching for potential underground or underwater crude oil and natural gas field, obtaining leases and permissions for drilling and the entire process of drilling.

The midstream sector involves the transportation of crude or refined petroleum products, usually via pipeline, oil tanker, barge, truck or rail. The final destination is refineries which then commences the downstream process. The midstream sector also includes the storage of these products as well as any wholesale marketing efforts. The midstream sector can also comprise of upstream and downstream elements due to its median positioning. For example, the midstream sector may include natural gas processing plants that purify the raw natural gas as well as removing and producing elemental sulfur and natural gas liquids (NGL) as finished end-products.

Recently, due to the rising price of crude oil, declining reserves of medium and light crude oil and abundance of unconventional crudes, the heavy crude oil and bitumen reserve exploitation is considerably favored. However, heavy crude oil and bitumen has many challenges to overcome, both in its production and in its transportation to refineries. Transporting heavy crude oil via pipeline is difficult due to its high density and viscosity (>1000 cP) and low mobility at reservoir temperature. Furthermore, contaminants like asphaltene deposition, heavy metals, sulfur and brine or salt make it difficult to be transported and refined using conventional refinery methods. Presence of brine or salt in heavy crude results in corrosion of the pipeline. In some cases, it may result in the formation of an emulsion such as oil-water mixture which makes transportation difficult. Due to the heavy molecular weight and high viscosity of heavy crude, a high pressure drop along the pipeline is expected making it costly and energy intensive. Furthermore, asphaltene deposition cases clogging in walls, decreasing the cross-sectional area available for oil flow.

Hence to address these problems and transport heavy crude, further processes may be carried out. They include:
(1) Viscosity reduction, e.g. preheating of the heavy crude oil and bitumen and subsequent heating of the pipeline, blending and dilution with light hydrocarbons or solvent. The viscosity of the blended mixture is determined by the diluent added and its rate. The dilution of the heavy crude requires two pipelines, one for the oil and other for the diluents, further adding additional costs.
(2) Emulsification through the formation of an oil-in-water.
(3) Drag/friction reduction (e.g. pipeline lubrication through the use of core-annular flow, drag reducing additive).
(4) In situ partial upgrading of the heavy crude to produce a Syncrude with improved viscosity, American Petroleum Institute (API) gravity, and minimized asphaltenes, sulfur and heavy metal content.

Partial upgrading of heavy oil involves conversion of only a portion of the vacuum residue and production of synthetic crude oil (SCO) containing 5-25% residue. They can be developed for half the cost of full upgrading but are not commercialized due to lack of technology, issues related to stability and the economics of SCO. However, in countries like Canada, due to their huge heavy crude oil resources, partial upgrading may be becoming a viable option.

The downstream sector is the last stage of oil and gas industry. It includes the refining of petroleum crude oil and the processing and purifying of raw natural gas. The marketing and distribution of products derived from crude oil and natural gas are also a part of this sector. The products delivered to normal consumers include gasoline or petrol, kerosene, jet fuel, diesel oil, heating oil, fuel oil, lubricant, waxes, asphalt, natural gas and liquified petroleum gas (LPG) as well as hundreds of petrochemicals.

In a standard oil refining process, the crude oil is desalted and passed through the atmospheric distillation that separates the it into fractions based on their range of boiling points. The atmospheric residue (AR) cut off temperature is about 350-360° C. Fractions below these boil off and are separated whereas the residue from atmospheric distillation containing longer carbon chains require further distillation at a reduced pressure and high temperature. Hence comes the vacuum distillation process that is important for further upgrading of crude oil and extract oils. The vacuum residue (VR) cut-off temperature is approximately 565° C.

However, despite AR and VR treatments, refineries that process heavier crude have a significant fraction of the incoming crude as residue (e.g., the Lloydminster Blend residue is approximately 50% @ 460° C.). Therefore, further processes are used to crack the heavy oil. Currently there are several technologies available for the cracking of crude oil. Of these, thermal cracking is considered to be the most efficient and is widely used for converting heavy, higher molecular weight hydrocarbons into lighter, lower molecular weight fractions.

The most commonly used cracking technologies are hydrocracking, fluid catalytic cracking and delayed coker. While all of these cracking processes are associated with some advantages, they come with significant drawbacks as well. General advantages include the ability to produce different types of fuel ranging from light aviation kerosene to heavy fuel oils in large quantities.

However, a significant disadvantage of the currently employed methods for synthesizing lighter fuels from crude oil is the high financial cost associated with the realization of the technology. Both capital and operating cost are typically high for these methods. Also due to the economy of scaling, all thermal processing is most efficient only at large volume to surface area. It is estimated that the minimum efficient scale for a full range refinery is approximately 200 thousand barrels per day (MBD) of crude oil capacity.

In particular, the existing technology is realized at high temperatures and pressures of the working medium and therefore requires specialty materials for the manufacture of chemical reactors and other special equipment. For example, the reactors are typically made from special grade alloy steels. Another factor that adds up to the huge costs of these processes is the $H_2$ embrittlement and its quality control. Hydrogen embrittlement is the process by which hydride-forming metals such as titanium, vanadium, zirconium, tantalum, and niobium become brittle and fracture due to the introduction and subsequent diffusion of hydrogen into the metal.

The operating conditions for a single stage hydrocracker are 660-800° F. (348-427° C.) with increasing 0.1-0.2° F. per day to offset loss of catalyst activity and pressure ranging from 1200 to 2000 psig. A fuel coker works at 910-930° F. (487-500° C.) with 15 psig typical pressures. For the fluid catalytic cracker, the reactor and regenerator are considered to be the heart of the fluid catalytic cracking unit. The reactor is at a temperature of about 995° F. (535° C.) and a pressure of about 25 psig while the regenerator for the catalyst operates at a temperature of about 1320° F. (716° C.) and a pressure of about 35 psig. These operating conditions tend to be very expensive to maintain.

Also, the capital cost of a reforming unit like hydrocracker is highly expensive. It is estimated that a hydrocracker requires five times the capital cost of atmospheric distillations. For example, if a crude distillation unit of 100,000 b/d capacity costs approximately $90 million to build, its hydrocracker with a complexity number of 5 will require $450 million to process the same capacity oil.

Additionally, the catalysts used in FCC processes are highly sensitive to the content of various impurities in the crude oil. The presence of sulfur in the crude oil in particular leads to rapid degradation of the catalytic properties of the catalyst. Thus pretreatment (desulfurization) of the feedstock needs to be done that increases the weightage of the cost. Moreover, nickel, vanadium, iron, copper and other contaminants that are present in FCC feedstocks, all have deleterious effects on the catalyst activity and performance. Nickel and vanadium are particularly troublesome. Further, withdrawing some of the circulating catalyst as a spent catalyst and replacing them with fresh catalyst in order to maintain desired level of activity for FCC technology, adds to the operational cost of the process.

Plasma chemical methods use various types of electrical discharges to create plasma. Such methods of oil cracking and reforming have been described in various patents and publications. For example, U.S. Patent Publication No. 2005/0121366 discloses a method and apparatus for reforming oil by passing electrical discharge directly through the liquid. The disadvantage of this method is the low resource electrodes and the associated high probability of failure of ignition sparks between these electrodes. Due to the high electrical resistance of oil, the distance between the electrodes is required to be very small. For example, the distance may be on the order of about 1 mm. However, the interelectrode distance increases rapidly due to electrode erosion, leading to termination and/or breakdown of the system. Furthermore, the use of such small gaps between the electrodes allows processing of only a very small sample size at any given time.

U.S. Pat. No. 5,626,726 describes a method of oil cracking, which uses a heterogeneous mixture of liquid hydrocarbon materials with different gases, such as the treatment of arc discharge plasma. This method has the same disadvantages associated with the small discharge gap described above and requires a special apparatus for mixing the gas with the liquid, as well as the resulting heterogeneous suspension. Heating of the mixture by a continuous arc discharge leads to considerable loss of energy, increased soot formation, and low efficiency.

Russian Patent No. 2452763 describes a method in which a spark discharge is carried out in water, and the impact from the discharge is transferred to a heterogeneous mixture of a gas and a liquid hydrocarbon or oil through a membrane. This increases the electrode discharge gap which increases electrode life but reduces the effectiveness of the impact of the spark discharge on the hydrocarbon or oil. This is because much of the direct contact of the plasma discharge with the hydrocarbon medium is excluded. Additionally, the already complicated construction using a high voltage pulse generator is further complicated by the use of a heterogeneous mixture preparation apparatus and device for separation of the treated medium from the water in which the spark discharge was created.

U.S. Pat. No. 7,931,785 describes methods having a high conversion efficiency of heavy oil to light hydrocarbon fractions. In these methods, the heterogeneous oil-gas medium is exposed to an electron beam and a non-self-maintained electric discharge. However, the practical use of the proposed method is challenging because, in addition to the complicated heterogeneous mixture preparation system, an electron accelerator with a device output electron beam of the accelerator vacuum chamber in a gas-liquid high-pressure mixture, is required. The electron accelerator is a complex technical device which significantly increases both capital costs and operating costs. In addition, any use of the fast electron beam is accompanied by a bremsstrahlung X-ray. As such, the entire device requires appropriate biological protections, further adding to the cost.

Plasma chemical reactors can be added as refinery upgrading technologies for all feedstocks. Implementation of such reactors in the refinery process rather than a heavy oil field process offers a simple and incremental development plan relative to field implementation. This is mainly because the oil to be passed through these reactors in the refineries will already have gone through many pre-processing such as dewatering, desalting, and atmospheric distillation. Hence, the overall processing will be significantly simpler compared to field implementation. The refinery can supply line voltage power, and carrier gases readily without additional requirements to include these in the upgrading process. Furthermore, these reactors will not have to meet the stringent pipeline requirements for viscosity, density, olefin content and oil stability needed in the field. From the refinery's perspective, there will be an increased production of desired distillates and decreased loading on the coker and hydrocracker, thus by debottlenecking the process chain.

SUMMARY

In one aspect, provided is an efficient electrical device for generating periodic spark discharges for chemical conversion of hydrocarbons or other feed material, wherein the device consists of a current-controlled circuit which rectifies a standard line input (including but not limited to 120 VAC 60 Hz, 240 VAC 60 Hz) into a high-voltage DC output (for example, 50 kV). The DC output may be applied across two or more electrodes spanning a two-phase mixture within a treatment reactor.

In another aspect, an apparatus comprises an oil treatment reactor for receiving a two-phase mixture of gas and liquid. The mixture may include a hydrocarbon to be converted. The apparatus may include a multi-electrode spark discharge circuit for hydrocarbon conversion, with the spark discharge circuit having electrodes exposed to the two-phase mixture in the oil treatment reactor. At least one high-voltage rectifier circuit may be operatively coupled to the spark discharge circuit. The apparatus may be configured to supply a power-controlled input to the spark discharge circuit in generating discharge sparks across the two electrodes.

In various implementations, the rectifier circuit may be configured to generate a high DC voltage from a low-voltage AC input.

In some implementations, the rectifier circuit may include at least one Cockcroft-Walton generator (CWG).

In various implementations, the rectifier circuit may operate in parallel off of a step-up transformer. The step-up transformer may be connected to a single-phase line input. The line input may be at least one of a 120 VAC 60 Hz input and a 240 VAC 60 Hz input.

In some implementations, a single step-up transformer powers multiple spark gaps in parallel.

In some implementations, the apparatus may have multiple transformers and multiple spark gaps, with one transformer for each spark gap, and with full electrical separation of each spark gap circuit.

In some implementations, the rectifier circuit includes a CWG.

In some implementations, the step-up transformer may be connected to a multi-phase line input so as to separate the differently-phased input AC voltages and attach one or more full CWG transformer setups to each input.

In some implementations, the rectifier circuit includes a half-wave single-stage CWG.

In some implementations, the rectifier circuit includes a multi-stage CWG.

In some implementations, the rectifier circuit includes a full-wave CWG.

In some implementations, a capacitance of at least one of the capacitors in the rectifier circuit affects energy per pulse for discharge sparks.

In some implementations, the rectifier circuit operates in parallel with a first power supply and a second power supply operating in conjunction with the first power supply. The first power supply may convert a standard AC line input to low-voltage DC output. The second power supply may convert low-voltage DC input to high-voltage AC output at any frequency.

In some implementations, the rectifier circuit is configured to have an output capacitance ranging from 1 pF to 1 nF, potentially taking advantage of any inherent stray capacitance of the circuit. In various embodiments, the rectifier circuit may be configured to have an output capacitance ranging from 10 pF to 50 pF. In certain versions, the rectifier circuit may be configured to have an output capacitance ranging from 5 pF to 200 pF. In other implementations, the rectifier circuit may be configured to have an output capacitance that is less than 1 pF or greater than 1 nF.

In some implementations, the apparatus is configured to generate a voltage ranging from 3 kV to 50 kV. In various embodiments, the apparatus may be configured to generate a voltage ranging from 30 kV to 40 kV. In certain versions, the apparatus may be configured to generate a voltage ranging from 20 kV to 60 kV. In some implementations, the apparatus may be configured to generate a voltage ranging from 10 kV to 100 kV. In other implementations, the apparatus may be configured to generate a voltage that is less than 3 kV or greater than 100 kV.

In another aspect, an example apparatus comprises a treatment reactor for receiving a mixture to be treated. The apparatus may include at least one multi-electrode spark discharge circuit, the at least one spark discharge circuit being implemented in the treatment reactor by exposing the two spark gap electrodes to the mixture. The apparatus may also include at least one high-voltage generator operatively coupled to the at least one spark discharge circuit. The generator may be configured to supply a power-controlled input to the at least one spark discharge circuit in generating discharge sparks across the two electrodes.

In some implementations, the generator is a Cockcroft-Walton generator (CWG) operatively coupled to the spark discharge circuit. The CWG may be configured to operate in series off of a step-up transformer.

In some implementations, the apparatus is configured for decontamination of at least one of food and water.

In another aspect, a hydrocarbon conversion apparatus comprises a discharge chamber having multiple electrodes separated by a gap. The apparatus may include a discharge circuit configured to generate a discharge across the electrodes. The apparatus may also include an inlet for conveying a hydrocarbon material to the discharge chamber such that hydrocarbon material reaches the gap between the electrodes, and an outlet for conveying a hydrocarbon fraction from the discharge chamber, the hydrocarbon fraction formed following a discharge across the electrodes while hydrocarbon material is situated in the gap. The voltage multiplier may be configured to provide a current-controlled input to the discharge circuit in applying electrical pulses to the hydrocarbon material via the electrodes.

In some implementations, the voltage multiplier is a Cockcroft-Walton generator.

In some implementations, the Cockcroft-Walton generator is a single-stage Cockcroft-Walton generator.

In some implementations, the Cockcroft-Walton generator is a multi-stage Cockcroft-Walton generator.

In some implementations, the Cockcroft-Walton generator is a half-wave Cockcroft-Walton generator.

In some implementations, the Cockcroft-Walton generator is a full-wave Cockcroft-Walton generator.

In some implementations, the Cockcroft-Walton generator is configured to generate high-voltage capacitor-discharging pulses for hydrocarbon conversion.

In some implementations, the apparatus further includes a step-up transformer.

In some implementations, the apparatus is powered using a high-voltage AC power source.

In some implementations, the voltage multiplier is a first voltage multiplier, and the apparatus further includes a second voltage multiplier configured to operate in parallel with the first voltage multiplier.

In some implementations, the apparatus further includes a step-up transformer operatively coupled to both the first voltage multiplier and the second voltage multiplier. The first and second voltage multipliers may be operatively coupled to a single step-up transformer.

In some implementations, the apparatus is powered using direct line power input.

In another aspect, a hydrocarbon conversion apparatus may comprise a discharge chamber, an inlet for conveying a hydrocarbon material to the discharge chamber, and an outlet for conveying a hydrocarbon fraction from the discharge chamber. The apparatus may include a plurality of voltage multipliers operating in parallel. The plurality of voltage multipliers may be configured to apply electrical pulses to the hydrocarbon material in the discharge chamber for hydrocarbon conversion. The electrical pulses may be applied via a discharge circuit supplied with a current-controlled input.

In some implementations, the plurality of voltage multipliers are Cockcroft-Walton generators.

In some implementations, the plurality of voltage multipliers operate in parallel off of a single step-up transformer.

In another aspect, a hydrocarbon conversion method comprises conveying, via an inlet, a hydrocarbon material to a discharge chamber. The method may also include using one or more Cockcroft-Walton generators to apply high-voltage capacitor-discharging electrical pulses to the hydrocarbon material in the discharge chamber for hydrocarbon conversion. The pulses may be applied via a two-electrode spark discharge circuit supplied with a current-controlled input. The method may additionally include conveying, via an outlet, a hydrocarbon fraction from the discharge chamber.

In some implementations, using the one or more Cockcroft-Walton generators comprises using a plurality of voltage multipliers operating in parallel.

In some implementations, the Cockcroft-Walton generators are part of an apparatus that is powered by a step-up transformer using direct line power input.

In another aspect, a system comprises a single-stage half-wave Cockcroft-Walton generator used to generate high-voltage capacitor-discharging pulses for hydrocarbon conversion, powered by a step-up transformer using direct line power input.

In another aspect, a system comprises a collection of single stage half-wave Cockcroft-Walton generators operating in parallel off of a single step-up transformer using direct line power input for use in hydrocarbon conversion.

In another aspect, a system comprises a single-stage full-wave Cockcroft-Walton generator used to generate high-voltage capacitor-discharging pulses for hydrocarbon conversion, powered by a step-up transformer using direct line power input.

In another aspect, a system comprises a collection of single stage full-wave Cockcroft-Walton generators operating in parallel off of a single step-up transformer using direct line power input for use in hydrocarbon conversion.

In another aspect, a system comprises a multi-stage half-wave Cockcroft-Walton generator used to generate high-voltage capacitor-discharging pulses for hydrocarbon conversion, powered by a step-up transformer using direct line power input.

In another aspect, a system comprises a collection of multi-stage half-wave Cockcroft-Walton generators operating in parallel off of a single step-up transformer using direct line power input for use in hydrocarbon conversion.

In another aspect, a system comprises a multi-stage half-wave Cockcroft-Walton generator used to generate high-voltage capacitor-discharging pulses for hydrocarbon conversion, powered by a step-up transformer using a high-voltage AC power source.

In another aspect, a system comprises a collection of multi-stage half-wave Cockcroft-Walton generators operating in parallel off of a single step-up transformer using a high-voltage AC power source for use in hydrocarbon conversion.

DETAILED DESCRIPTION

The present technology relates to the field of processing liquids containing heavy hydrocarbon molecules into the lighter liquid and/or gaseous fractions. The present technology can be utilized for the cracking of liquid heavy oils to lighter hydrocarbon fractions by using a stream of carrier gas injected into the liquid heavy oil to form a mixture, followed by ionization of the mixture by electric discharge. This technology can be effectively applied to achieve efficient heavy oil conversion.

In one aspect, a process is provided for cracking liquid hydrocarbon materials into light hydrocarbon fractions by using a spark discharge. The process includes flowing a liquid hydrocarbon material through a discharge chamber and into an inter-electrode gap within the discharge chamber, where the inter-electrode gap is formed between two or more electrodes spaced apart from one another. The process further includes injecting a carrier gas into the liquid hydrocarbon material as it enters the inter-electrode gap, thereby forming a gas-liquid hydrocarbon mixture. The electrodes include one or more positive electrodes and one or more negative electrodes, the negative electrodes being connected to a capacitor. The capacitor is charged to a voltage equal to, or greater than the breakdown voltage of the carrier gas in the inter-electrode discharge gap. As the gas-liquid hydrocarbon mixture is formed, it is subjected to a current between the electrodes at a voltage sufficient to effect a spark discharge. The process also includes recovering the light hydrocarbon fractions resulting from the impact of the pulsed spark discharge on the gas-liquid hydrocarbon mixture.

Figure 1B:
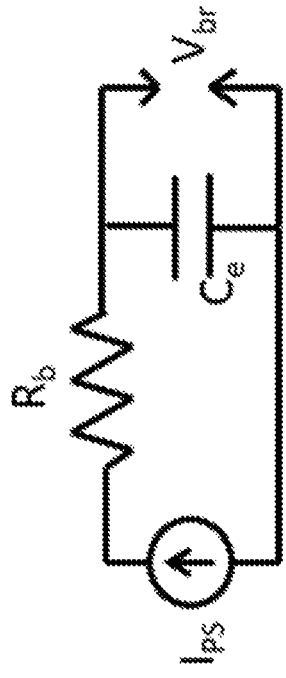
FIGS. 1A-1D provide example diagrams for various versions of a resistor-capacitor (RC) spark discharge circuit, using either a voltage-controlled (FIG. 1A, 1C) or current-controlled (FIG. 1B, 1D) supply which is either ideal (1A, 1B) or non-ideal (1C, 1D). The dotted line on the circuits of 1C and 1D indicate internal components of the non-ideal power supply.
Figure 1D:
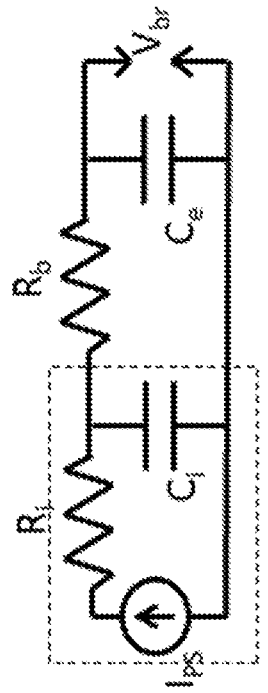
Figure 1A:
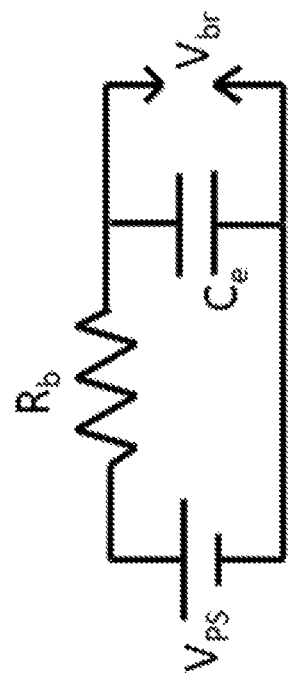
Figure 1C:
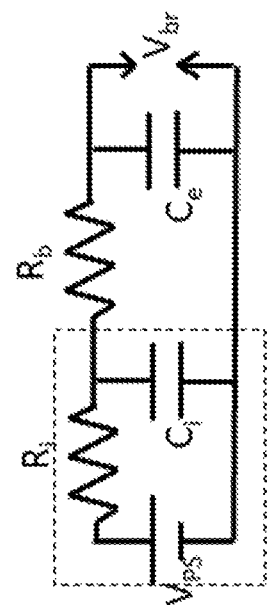

In certain implementations, plasma discharges may be used to partially upgrade crude oil before processing in a refinery. The plasma discharges may be generated in an apparatus having a resistor-capacitor (RC) circuit, with a spark gap in parallel with the capacitor. In different versions, the power supply used can be either a voltage source (FIG. 1a) or a current source (FIG. 1B). The nomenclature used in these circuits is provided in Table 1 below, and circuit equations applicable to the constant voltage and constant current scenarios are provided in Table 2 below. The term "constant current" as used herein refers to controlled current levels such that current is maintained at a substantially constant level or is otherwise relatively limited in its variability by virtue of one or more circuit elements.

TABLE 1

| Value | Symbol |
|---|---|
| Resistance of resistor | R |
| Capacitance of capacitor | C |

TABLE 1-continued

| Value | Symbol |
|---|---|
| Voltage of power supply | V |
| Current of power supply | I |
| Power of power supply | P = IV |
| Breakdown voltage of spark gap | $V_{br}$ |
| Circuit efficiency (to energy into spark) | H |
| Energy per pulse of spark gap | $E_{per\ pulse}$ |
| Spark gap pulsing frequency | $f_{pulses}$ |

TABLE 2

| | Constant Voltage | Constant Current |
|---|---|---|
| Efficiency | $\eta = \dfrac{E_{out}}{E_{in}} = \dfrac{V_{br}}{2V}$ | $\eta = \dfrac{E_{out}}{E_{in}} = \dfrac{V_{br}}{2IR + V_{br}}$ |
| Pulsing Frequency | $f_{pulses} = \dfrac{1}{RC \ln(V/V - V_{br})}$ | $f_{pulses} = \dfrac{I}{V_{br}C}$ |
| Energy per Pulse | $E_{per\ pulse} = 1/2\ CV_{br}^2$ | $E_{per\ pulse} = 1/2\ CV_{br}^2$ |
| Average Input Power | $P_{avg} = \dfrac{V_{br}^2}{2R \ln(V/V - V_{br})}$ | $P_{avg} = 1/2\ V_{br}I$ |
| Voltage across R | $V_R = Ve^{-t/RC}$ | $V_R = IR$ |
| Power used by R | $P_R = V^2/R\ e^{-2t/RC}$ | $P_R = I^2R$ |
| Voltage across C | $V_c = V(1 - e^{-t/RC})$ | $V_c = It/C$ |
| Power on C | $P_C = V^2/R\ (1 - e^{-t/RC})\ e^{-t/RC}$ | $P_C = I^2t/C$ |
| Current | $I = V/R\ e^{-t/RC}$ | I |

Figure 4B:
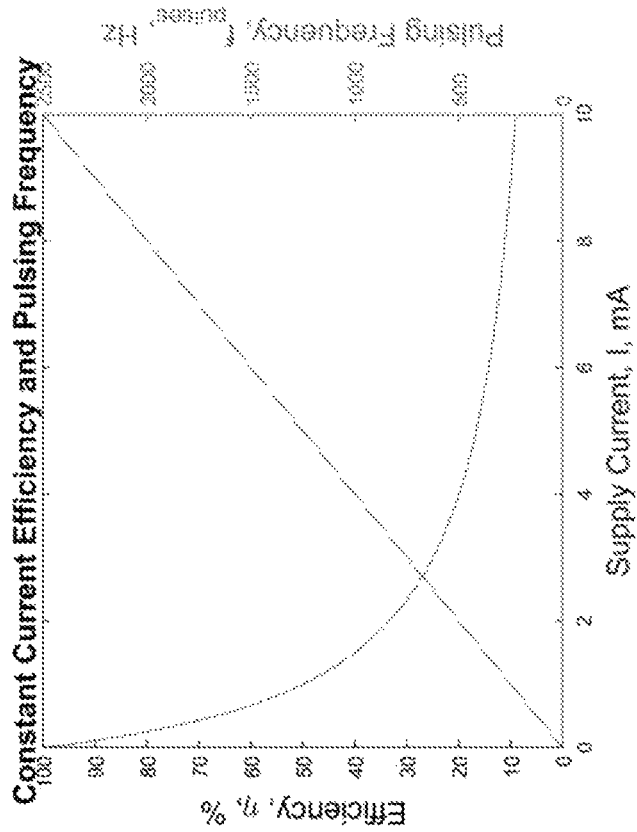
FIGS. 4A-4B provide example constant voltage (4A) and constant current (4B) efficiencies and pulsing frequencies for example RC circuits.
Figure 4A:
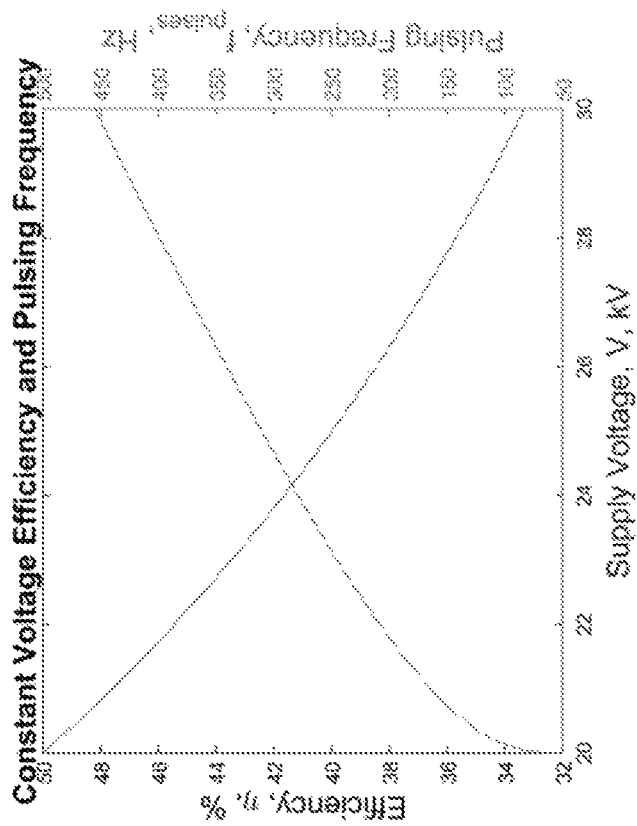
Figure 5:
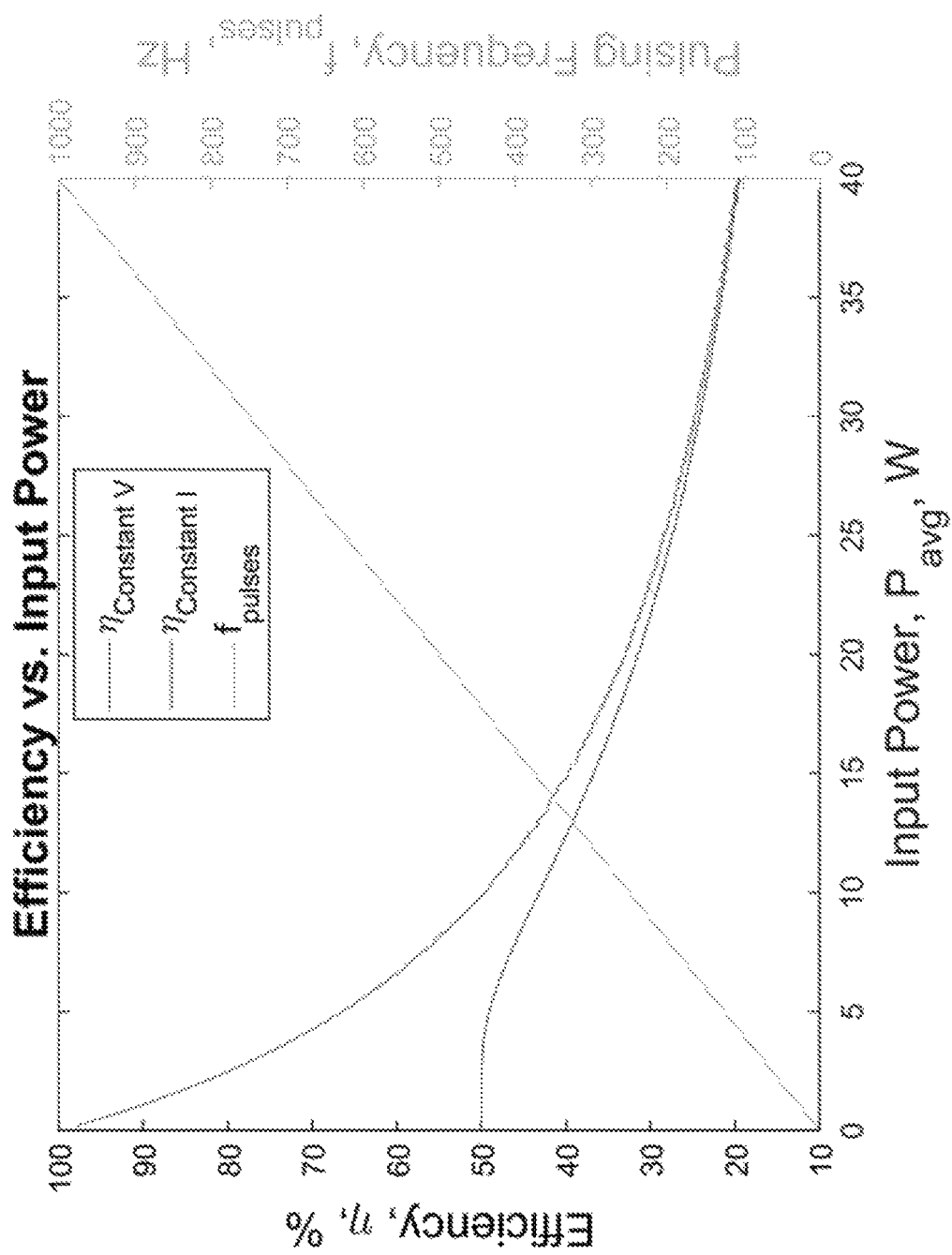
FIG. 5 provides representative efficiency versus input power values for constant current and constant voltage RC circuits. Circuit charging efficiency ($\eta = P_{out}/P_{in}$) is shown as a function of average input power for the RC spark discharge circuit, using either a voltage-controlled ($\eta_{Constant\ V}$) or current-controlled ($\eta_{Constant\ I}$) cases. ($C_e$=200 pF, $R_b$=10 MΩ, and $V_b$=20 kV.)

For purposes of the discussion corresponding to FIGS. 3-5, it will be assumed that the circuit elements are held constant, namely that C=200 pF, R=10 MΩ, and $V_{br}$=20 kV (set gap distance, etc.). In addition, the average power will be considered to be set to be equal whenever possible (i.e., when V and I are not varying). This condition also makes the frequency of pulses equal for both circuits, since the energy per pulse is the same for both circuits ($P_{avg} = E_{per\ pulse}\ f_{pulses}$).

Representative time responses for the circuits of FIG. 1 are shown in FIG. 3 for two pulses. In these examples, the constant voltage circuit has exponential behavior where the current drops as the capacitor is charged. The constant current circuit has a linearly increasing voltage for both the capacitor and power supply offset from each other by the resistor's constant voltage drop. The instantaneous power across each component is seen in FIGS. 3d and 3h, where there is a discontinuity during the discharge event. The constant voltage circuit has decreasing power across the resistor while the capacitor has a more complicated behavior, increasing at first and then decreasing. The constant current circuit has a constant instantaneous power across the resistor due to the constant current and a linear power drop across the capacitor.

The efficiencies for the representative circuits can be seen in FIGS. 4 and 5, where the maximum efficiency for the constant voltage circuit is shown as 50%. This occurs when the voltage is set exactly at the breakdown voltage. This implies that a substantial proportion of the energy input into the system (i.e., 50% or more) will be burned by the resistor. The maximum efficiency for the constant current circuit, however, is shown to be 100% as the current tends to zero. This efficiency may only be attainable when the voltage drop across the resistor is minimized to essentially zero (also achievable with R→0).

As seen in the representation of FIG. 5, the pulsing frequency is proportional to the input power. Since the current and input power are proportional in the constant current circuit, increasing the current causes a proportional increase in the power. In the constant voltage circuit this behavior is not linear, rather logarithmic.

Figure 6A:
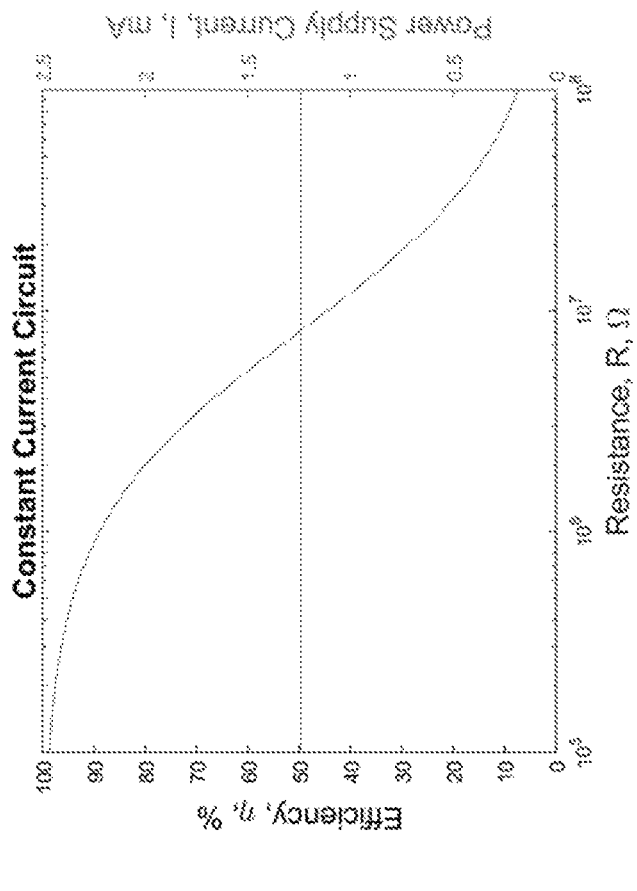
FIGS. 6A-6B provide example efficiency versus resistance at constant input power for constant voltage (6A) and constant current (6B) RC circuits.
Figure 6B:
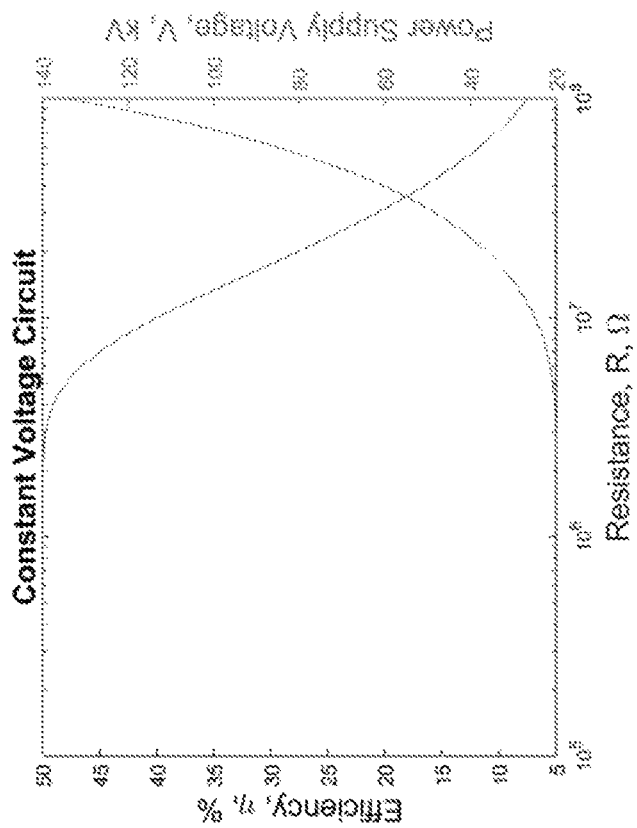

For the discussion corresponding to FIG. 6, the resistance is varied while holding the other circuit elements constant, namely that C=200 pF, $V_{br}$=20 kV, and $P_{avg}$=12.43 W. This average input power delivered from the power supply is the same average input power as the time-dependent graphs (see FIG. 3), which yields a pulsing frequency of 310.7 Hz for both circuits. As a result the power supply voltage changes as well to keep the input power constant. As the resistance is decreased, the efficiency approaches a maximum efficiency, which is only 50% in the constant voltage circuit, but is 100% in the constant current circuit.

External parameters (e.g., chemistry considerations in the spark discharge, bubble dynamics, etc.) affect the optimum energy per pulse, breakdown voltage, and pulsing frequency. This is because in these representations, the energy per pulse only depends on the capacitance and breakdown voltage, both of which affect the nature of the discharge and thus the chemistry that occurs in the oil. The frequency of pulses may be set partially on the oil flow rate, as well as bubble dynamics and other factors, such that a more uniform oil treatment can be achieved. Generally, if the frequency is too low, less oil may be treated, while a frequency that is excessive may mean the oil may be over-treated and not mix well.

With the breakdown voltage, capacitance, and frequency set by the external parameters, the average power may be determined, which determines the voltage or current needed from the power supply. This leaves resistance as a parameter to select for the circuit. In representative constant voltage circuits, the choice of resistance is not independent of the choice of power supply voltage as seen in the dependence of the pulsing frequency on resistance value (see, e.g., FIG. 6), however in the representative constant current circuit the resistance only affects the efficiency, thus the choice of resistance is independent on the power delivered to the spark gap.

Real-world power supplies are not perfect as they have internal resistance and output capacitance. However, in various implementations, a system, once designed, would not have varying power, and consequently, the design can be made to set optimal conditions that will vary less greatly from the ideal circuit. Moreover, in various implementations, a current source can be achieved using a voltage source with a very low output capacitance that behaves more like a current source.

In various embodiments, as suggested by the above analysis, the preferred choice of circuit would be a constant current power supply, irrespective of the parameters for the plasma conditions. In such embodiments, the choice of the constant current supply may achieve the highest efficiency of the two options considered here. That is, while the constant voltage system has a theoretical maximum efficiency of 50% in the above representations, constant current systems can have much higher efficiencies, theoretically approaching 100%. Certain idealized circuit analyses for the power source may slightly reduce efficiencies, but a constant current source with a higher theoretical efficiency may be preferable. Consequently, in various implementations, high electrical efficiencies are possible when operating a high-voltage charging-capacitor spark gap circuit in a constant current mode, relative to constant voltage operation.

In certain embodiments, a high-voltage plasma generator which operates off of a standard available line power (e.g., 60 Hz, 120 to 480 VAC) may achieve an efficiency of, for example, 70% or greater. As discussed below, in various implementations, for example, a Cockcroft Walton generator powered by a step-up transformer may be used.

RC charging circuits, with a ballast resistor and capacitor in series and a spark gap in parallel with the capacitor, may be used to create spark discharges. For reasons provided above, such a circuit may be more efficient when operating in a constant current mode. However, the ballast resistor in this circuit may be a dissipative element, with a power loss equal to $P_R=I^2R$. Because of this, in some implementations, the only way to increase this circuit's efficiency without decreasing the ballast resistance (needed for power supply protection) is to let the charging current I (proportional to pulsing frequency) become very small. Also, commercially available power supplies with a constant current setting may not be optimized for efficiency.

Figure 7:
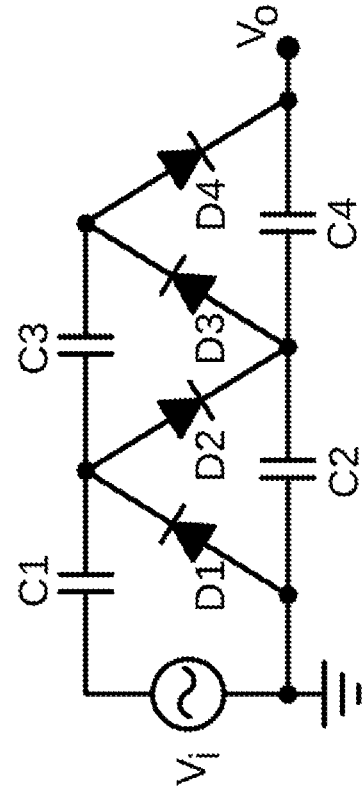
FIG. 7 provides a representative circuit diagram for an example two-stage half-wave Cockcroft-Walton generator with AC output $V_i$ and DC output $V_o$.

To address such issues, in some implementations, a Cockcroft-Walton generator (CWG) may be used as an alternate high-voltage DC sparking circuit. Referring to FIG. 7, this circuit uses a combination of diodes and capacitors to rectify AC input to DC output at the high voltages necessary for oil conversion (~30 kV). In some versions, single-stage circuits of this type (1 stage=2 capacitors & 2 diodes) can be assembled in series as a larger multi-stage CWG in order to linearly increase the output voltage according to the equation $V_o = N_{stages} V_{pp}$, where $V_{pp}$ is the peak-to-peak AC input voltage, $N_{stages}$ is the number of stages, and $V_o$ is the output DC voltage. Since a CWG has no dissipative elements, it may be very (ideally 100%) efficient. The main power loss may be due to ohmic heating of non-ideal diodes. In certain implementations, for the AC high voltage input needed to power such a circuit, a step-up transformer connected directly to line power can be used, which also has no dissipative elements and is in general also very efficient.

Figure 8:
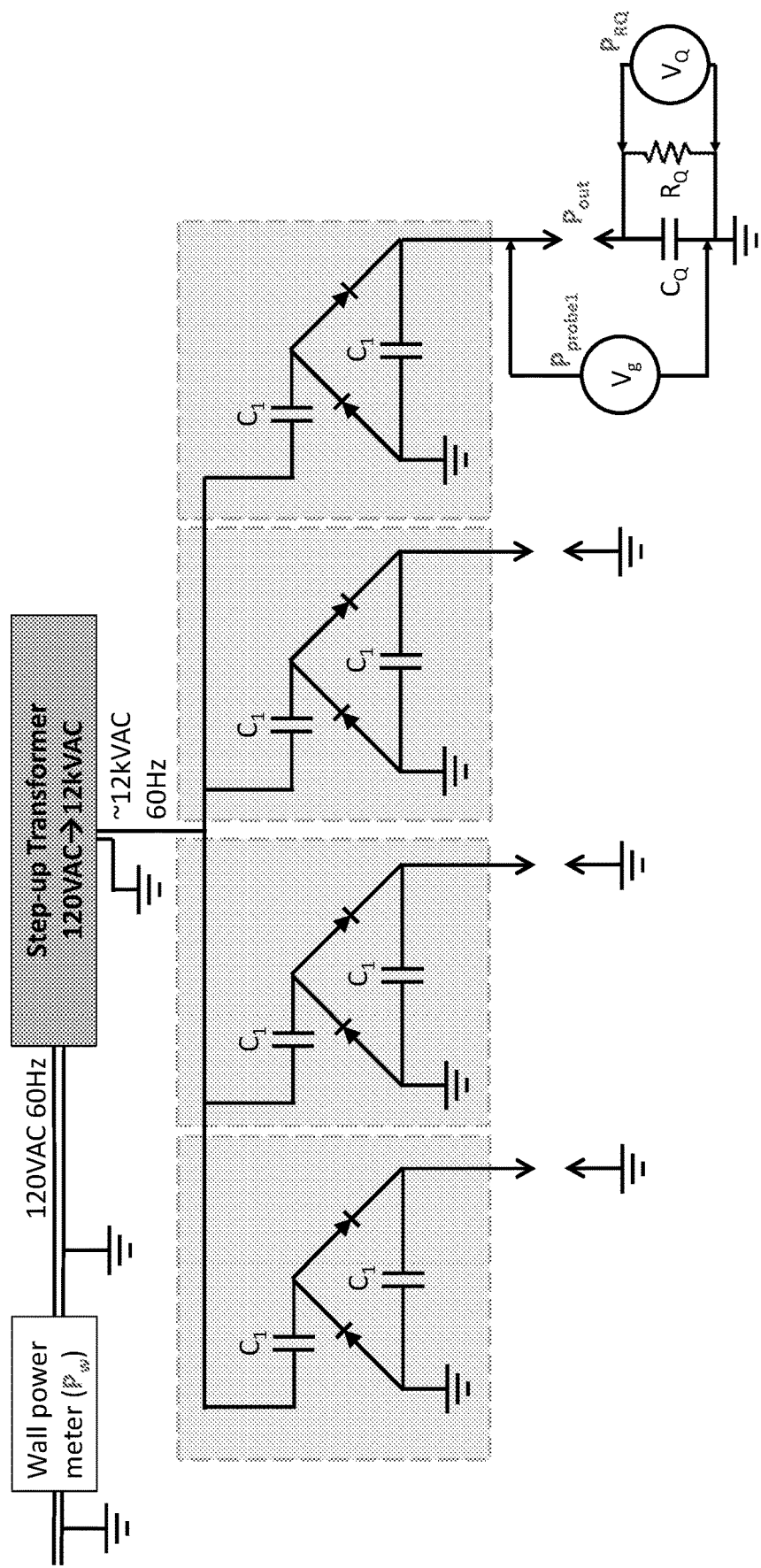
FIG. 8 provides a representative full circuit diagram of T+4CWG setup for powering four spark gaps, with accompanying diagnostic components attached to the right-most spark gap. For experimental data presented in this disclosure, $C_1$=110 pF, $C_Q$=0.57 pF, and $R_Q$=22.3 MΩ).
Figure 9A:
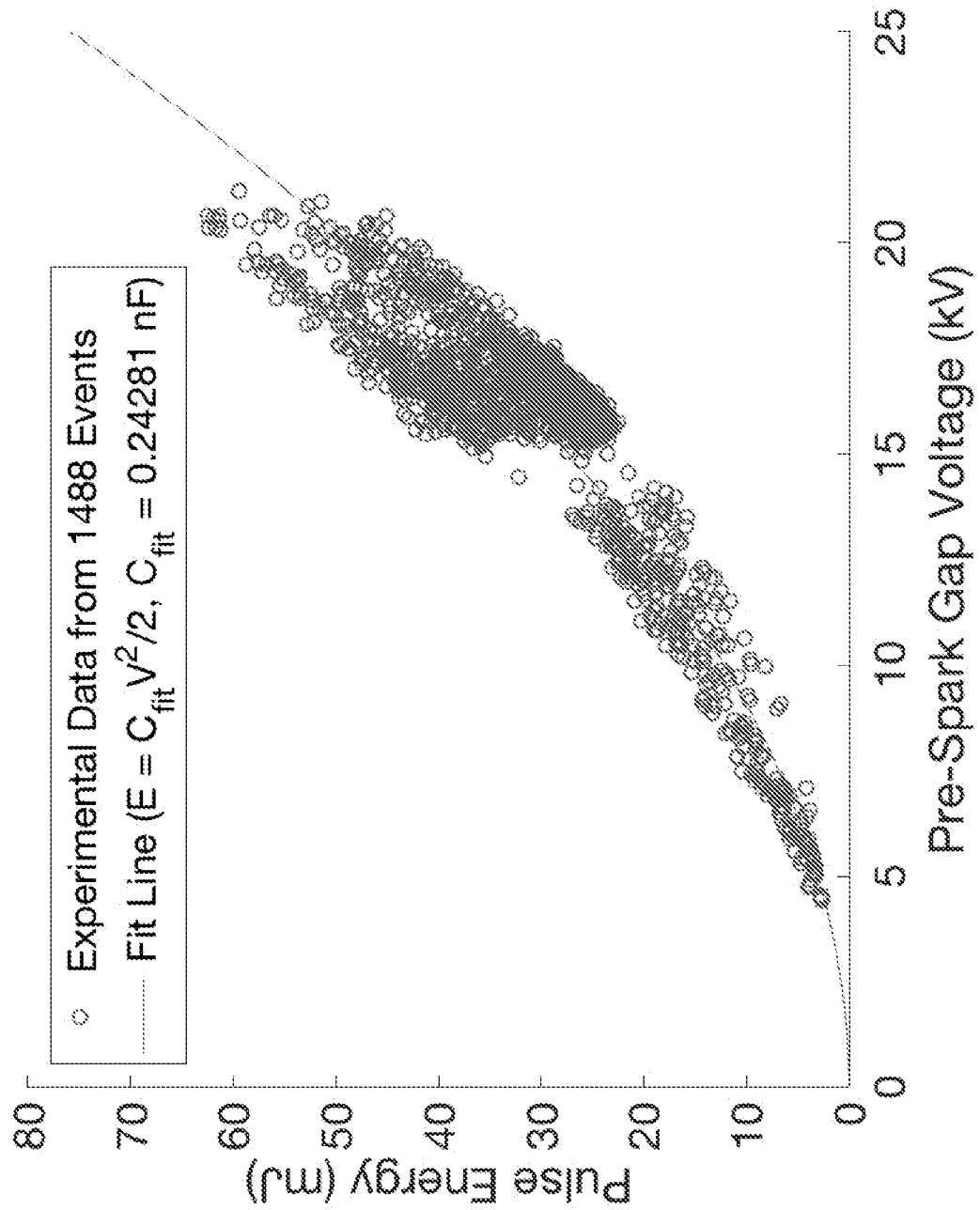
FIGS. 9A-9D provide example scatter plots of pulse energy as a function of breakdown voltage for each of the four spark gaps operating in parallel (see Example 1), at an average gap spacing of 5 mm.
Figure 9B:
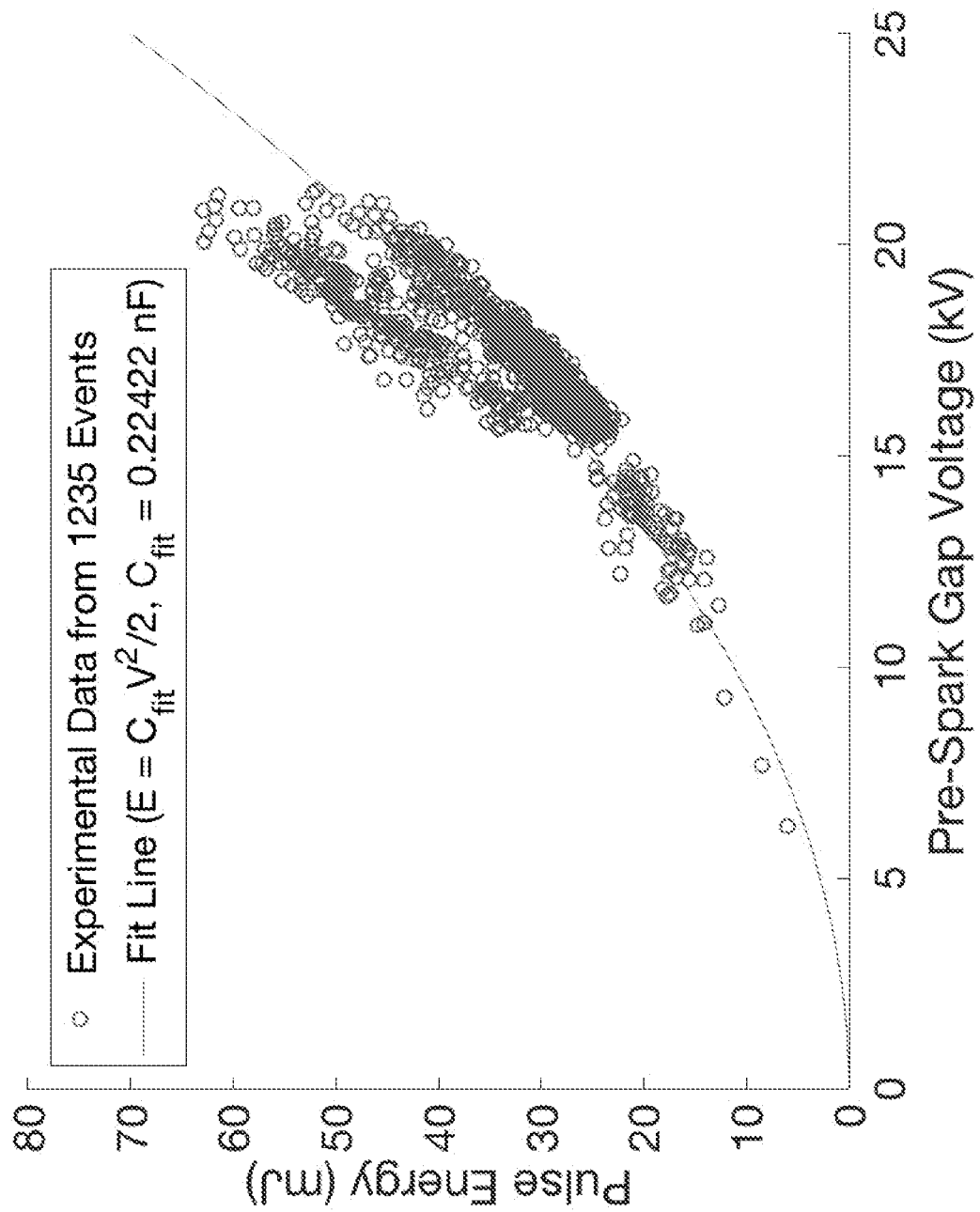
Figure 9C:
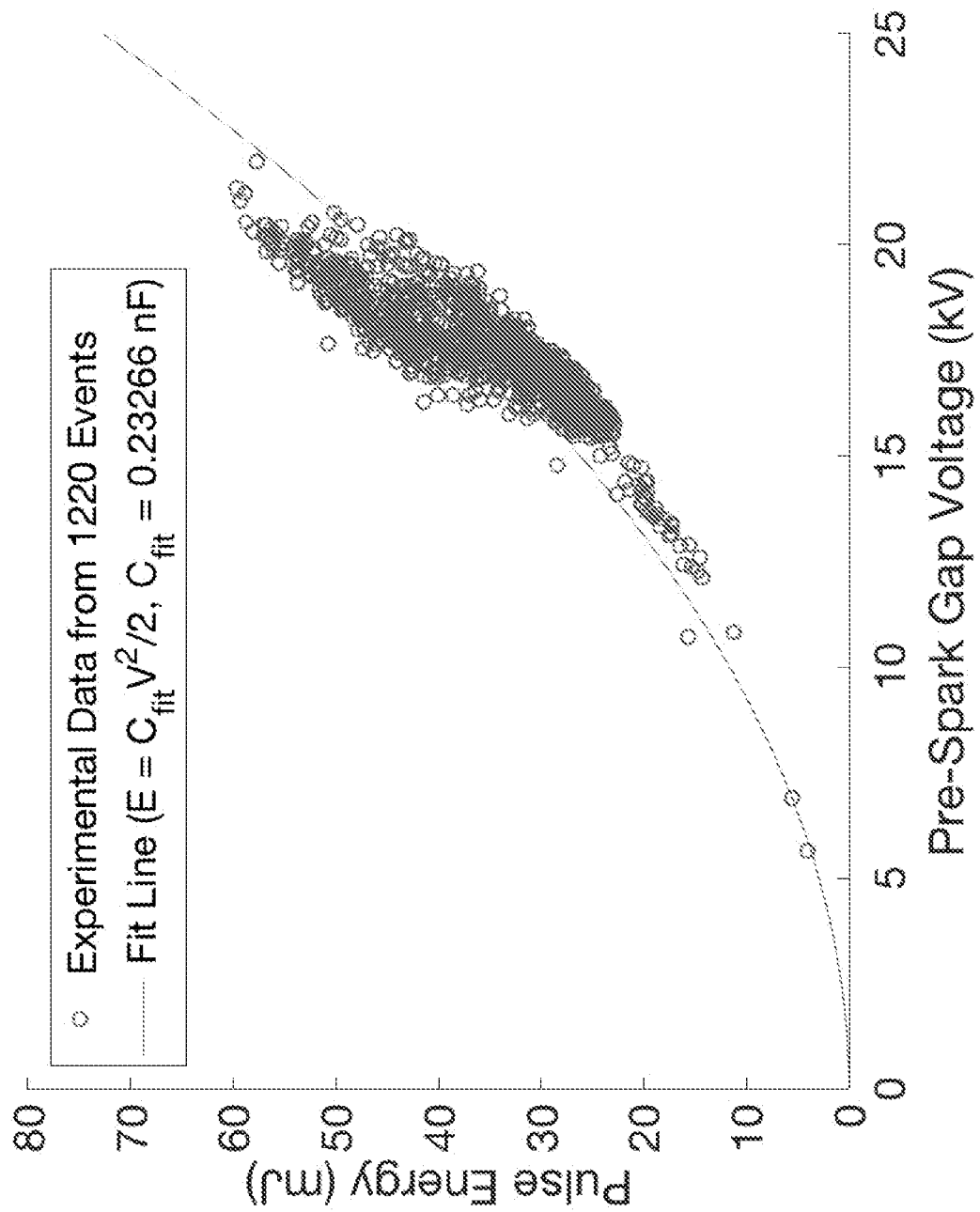
Figure 9D:
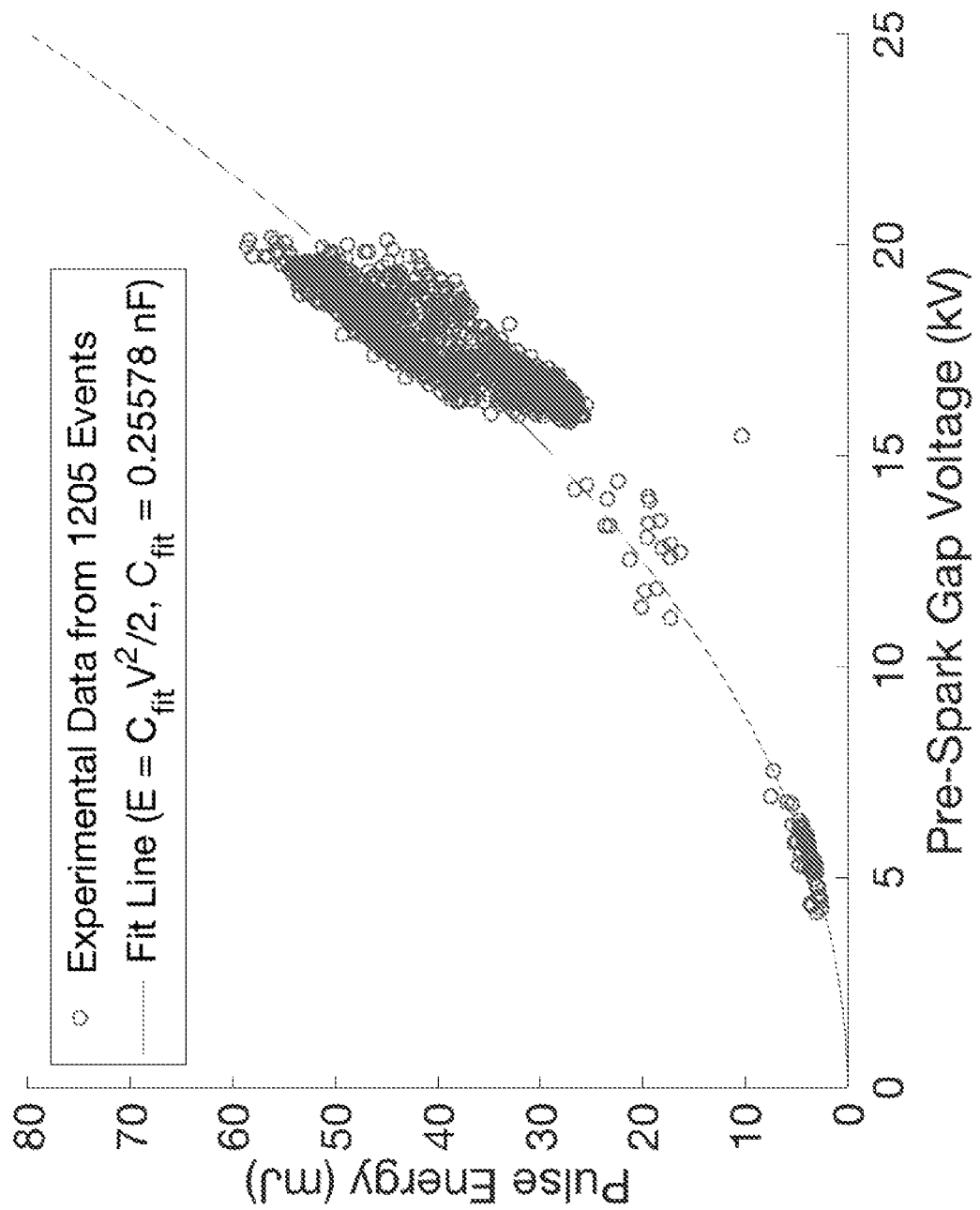

In various implementations, such circuits may be modified so as to power multiple spark gaps in parallel. Such implementations may be advantageous for applications that are to be scaled-up. Connecting multiple parallel spark gaps to a single high-voltage DC output may not produce the intended operation in certain situations because power output may not be evenly distributed among the multiple gaps, potentially sparking across a single gap exclusively. However, in certain implementations, a circuit including multiple Cockcroft-Walton subcircuits powered by, for example, a single AC input (as illustrated in FIG. 8) may be used to scale up to a large number of CWG-powered spark gaps, with the step-up transformer configured to supply sufficient power.

An efficiency analysis corresponding to four parallel single-stage CWG-powered spark gaps will now be provided to illustrate potential efficiency gains. Specifically, electrical efficiency of the circuit depicted in FIG. 8, with a single 120 VAC-to-12 kVAC transformer powering four separate Cockcroft-Walton generator spark gap subcircuits (T+4CWG), will be discussed. While the efficiency analysis that follows is applicable to plasma-based power output into any type of media, experiments have been carried out using spark gaps in air with intended application using spark gaps across an oil-gas mixture. Hence the pairs of arrowheads (→←) in FIGS. 8, 14, 17, and 19 should be interpreted as the general case: a spark gap across an unspecified media. The primary independent variable for the experimental data presented in this section was spark gap spacing. Each spark gap was manually adjusted using a physical spacer, such that all four were as similar as possible before measurement. Gap spacings of 2.7 mm, 3.2 mm, 4.6 mm, and 5.0 mm were tested. In FIG. 8, the rightmost CWG subcircuit includes additional circuitry around the spark gap. This is a charge-per-pulse device developed to calculate energy per pulse and average power output. This device was moved to each of the other three spark gaps between measurements, resulting in four similar datasets per session. Since four different gap spacings were tested for four parallel spark gaps, sixteen total datasets were collected and analyzed (see Table 3).

The example method of efficiency calculation depends on quantification of the average energy exerted in the plasma during a discharge event. To do this, an electrical diagnostic method was developed for measuring the total amount of charge moved per spark, shown as the subcircuit attached to the right-most spark gap in FIG. 8. From charge per pulse, energy per pulse is calculable. This procedure for calculating energy per pulse operates by noting $V_Q$'s value (as defined in FIG. 7) immediately before and immediately after a spark event: $\Delta V_Q = V_{Q,after} - V_{Q,before}$. Energy per pulse can then be calculated via $E_{pulse} = \frac{1}{2} \cdot C_Q \cdot \Delta V_Q \cdot V_b$, where $V_b$ is measured by taking $V_g$'s value (as defined in FIG. 7) prior to breakdown. This procedure was repeated for each spark event during the one-second measurement interval, and an average $E_{pulse}$ was calculated. FIG. 9 provides plots of $E_{pulse}$ as a function of $V_b$ for a single dataset, which fits with the quadratic function $E_{pulse} = \frac{1}{2} \cdot C_{equiv} \cdot V_b^2$ very well (using $C_{equiv}$ as the least-squares fit parameter). $C_{equiv}$ was found to have an average value of 240 pF over all datasets in this experiment, which is comparable to the case where the two C1 capacitors in a single CWG add in parallel for a single spark event, $C_{equiv} \approx C_1 + C_1 = 220$ pF. Average output plasma power $P_{out}$ may then be calculated via $P_{out} = E_{pulse} \cdot f_{avg}$, where $f_{avg}$ is the average spark frequency during the measurement interval.

Figure 10:
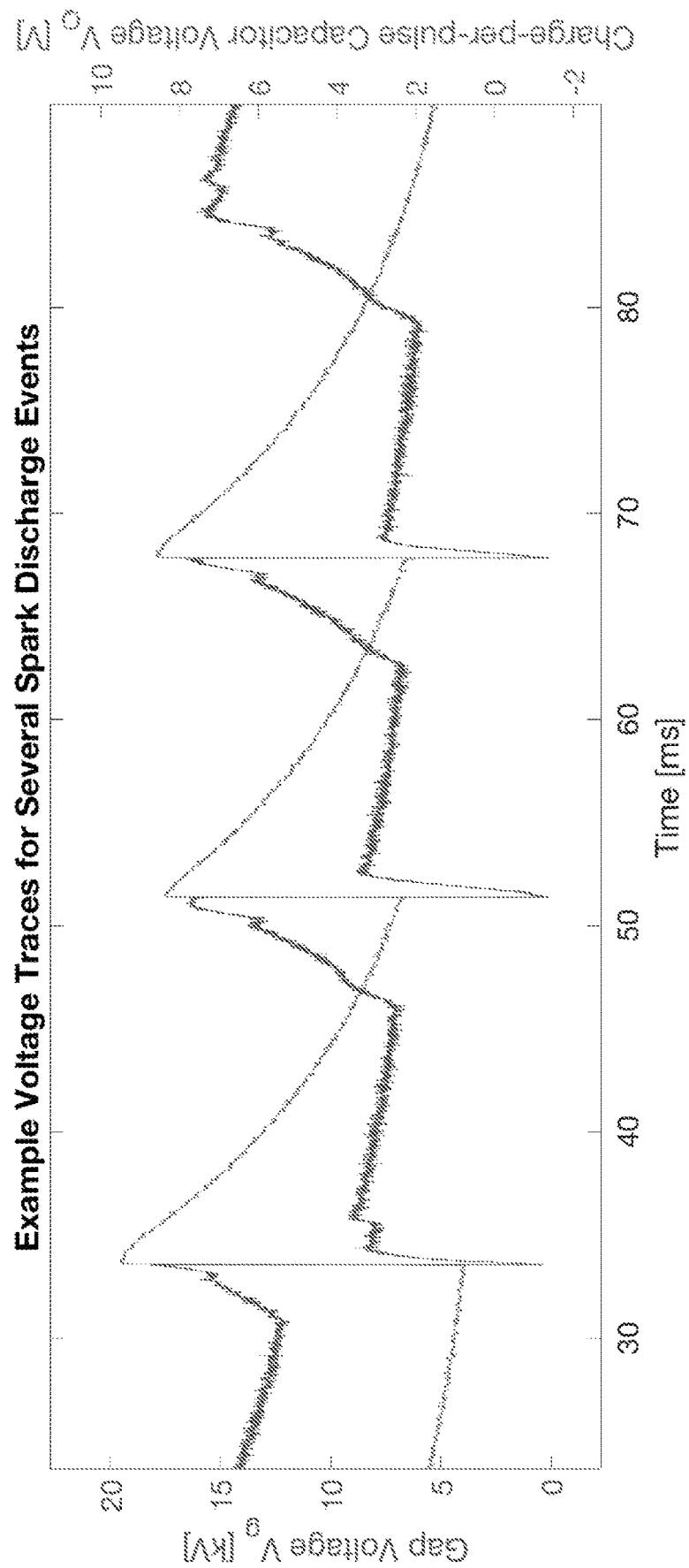
FIG. 10 provides example voltage traces for $V_g$ and $V_Q$ (as defined in FIG. 7) used to calculate individual pulse energies via $E_{pulse} = \frac{1}{2} \cdot C_Q \cdot \Delta V_Q \cdot V_b$.
Figure 11:
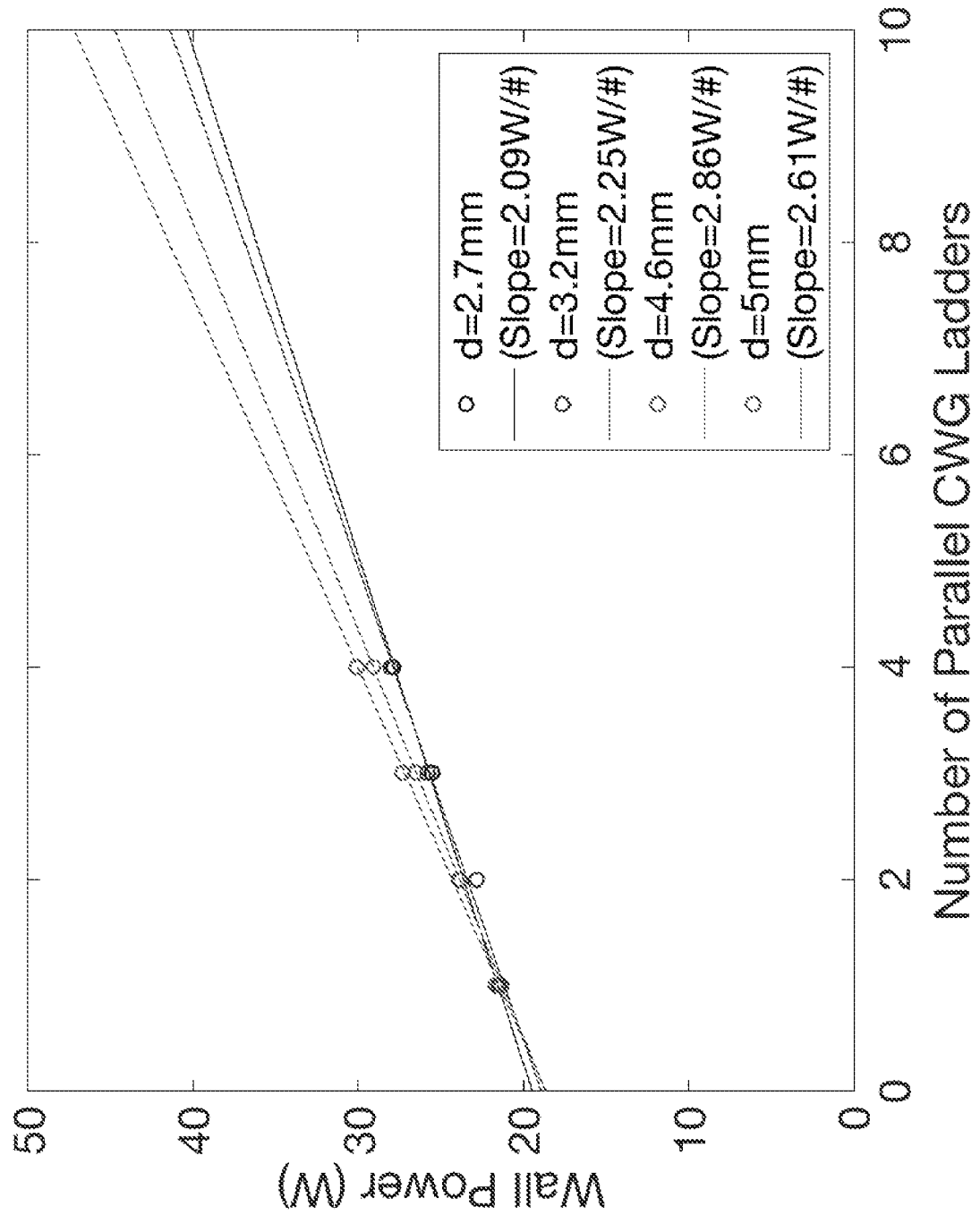
FIG. 11 provides an example plot of wall power as a function of number of parallel CWG setups, corresponding to the datasets detailed in Table 3.
Figure 12A:
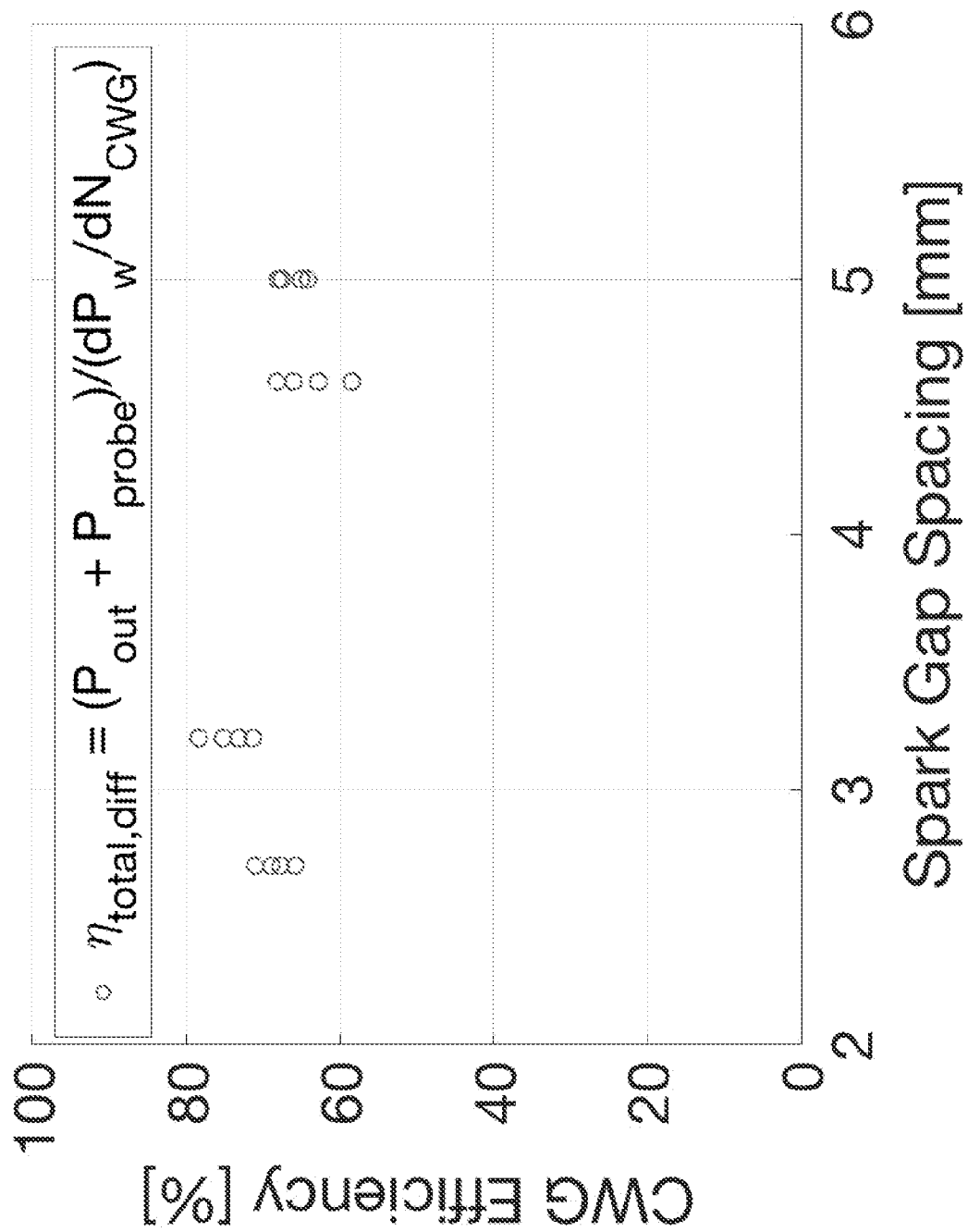
FIGS. 12A-12D provide selected example plots created from the tabulated data in Table 3.
Figure 12B:
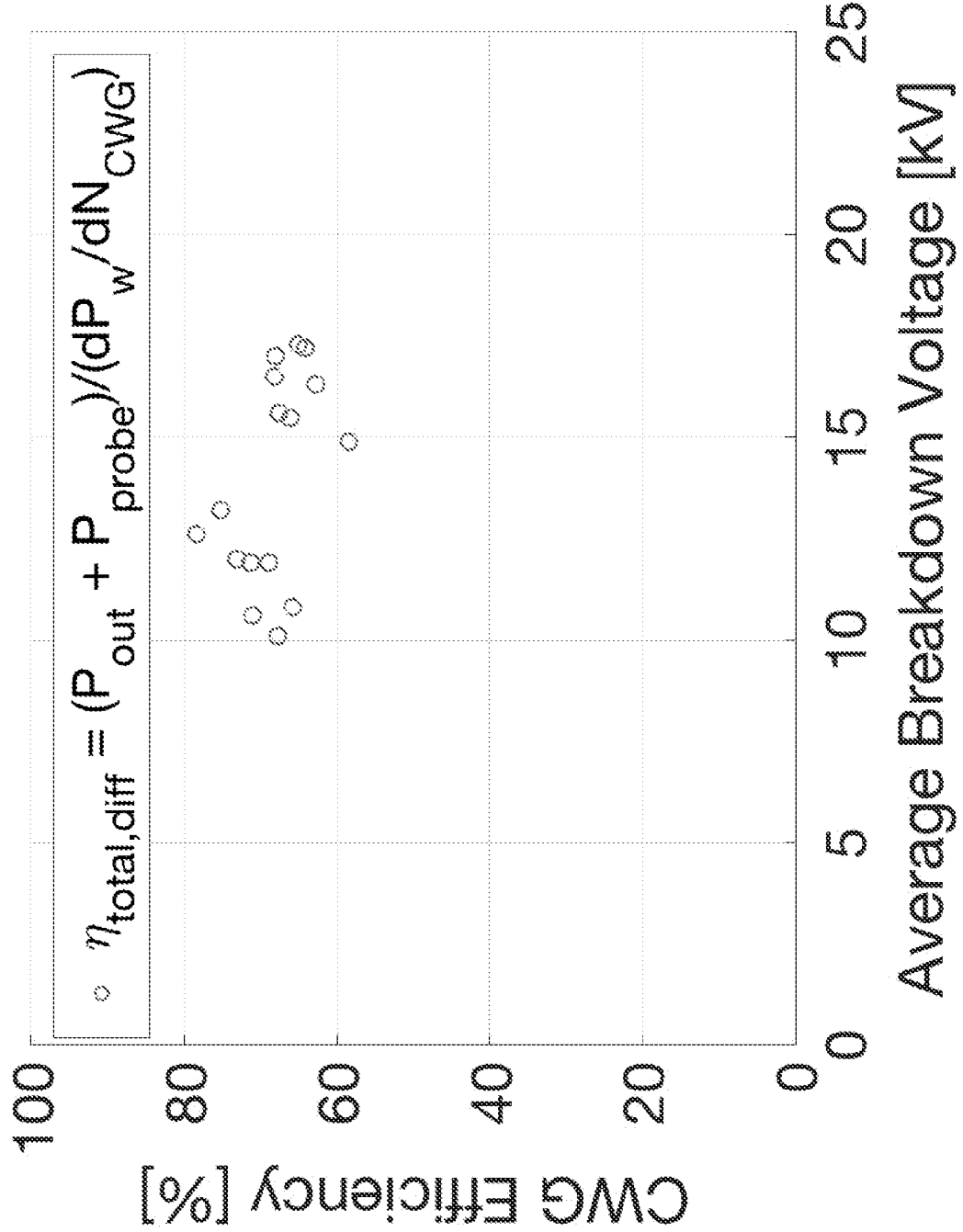
Figure 12C:
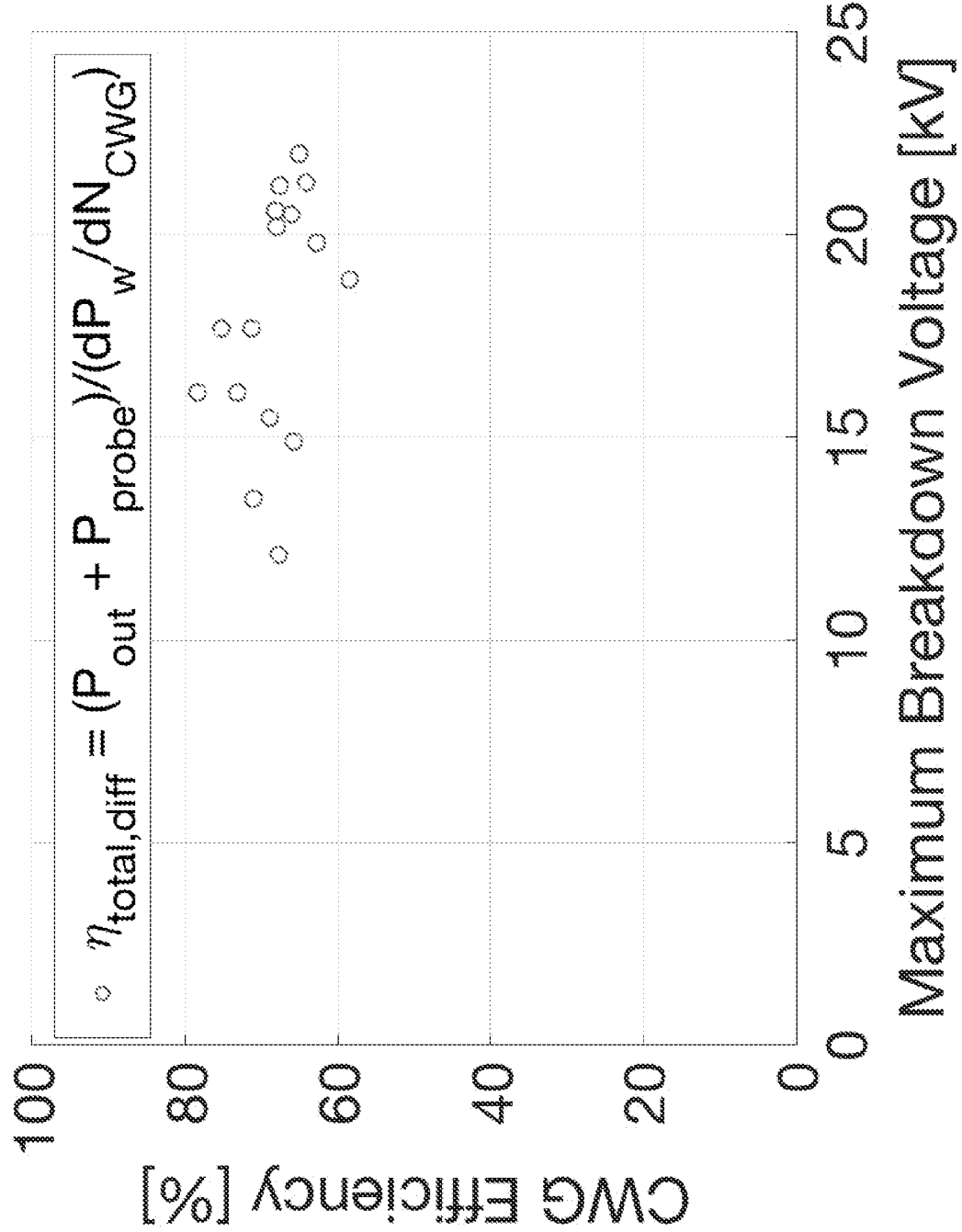
Figure 12D:
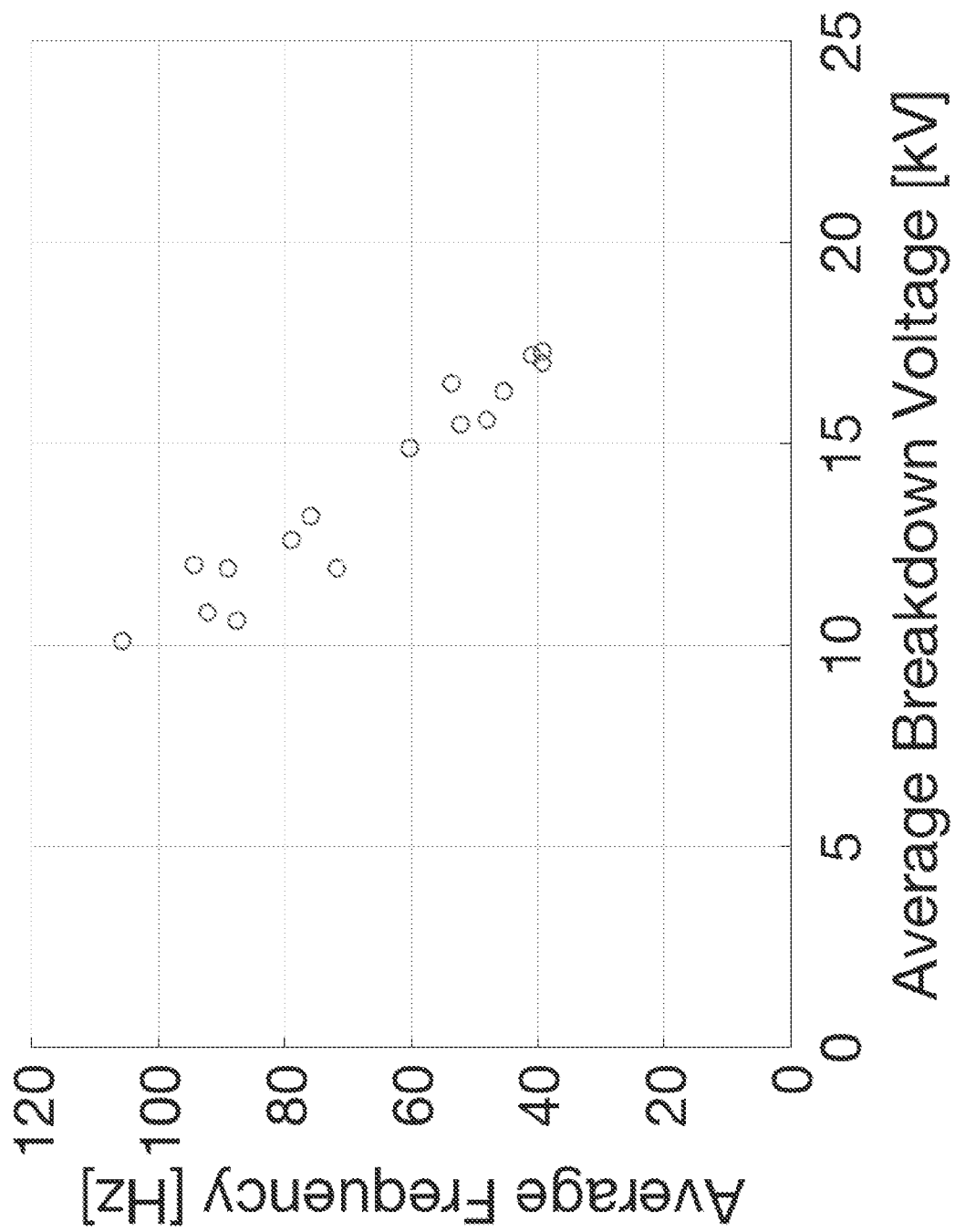

The average values of $P_w$, $P_{probe1}$, and $P_{RQ}$ were also measured alongside the above calculated $P_{out}$ measurement in order to determine efficiency. $P_w$ was measured via manual observation of a Kill-A-Watt wall power meter, while $P_{probe1}$ and $P_{RQ}$ were determined via $P_R = (V^2/R)$. Before taking the voltage data used for energy-per-pulse analysis, $P_w$ was first measured for different loads (by varying the number of CWG subcircuits operating in parallel, $N_{CWG}$), as shown in FIG. 10. From this plot it can be seen that the function $P_w = f(N_{CWG})$ has strong linearity in each case, with an average intercept of $P_w = f(N_{CWG}=0) = \sim 19.0$ W and an average slope of $dP_w/dN_{CWG} = \sim 2.5$ W/#. Assuming that this relation remains linear, the transformer will become more efficient when powering more CWG setups in parallel. While this may not be economical for low-power applications (e.g., $P_w < 50$ W), example implementations of this circuit design may be very useful for scaled-up high-power versions of the reactor (e.g., $P_w \sim 900$ W). The above assumption also implies that each CWG setup receives an average input power equal to $dP_w/dN_{CWG}$ from the transformer, calculated via linear regression of the data shown in FIG. 11.

Using the aforementioned data, the differential efficiency of the full setup may be defined and calculated as $\eta_{total,diff} = (P_{out} + P_{probe1})/(dP_w/dN_{CWG})$, as tabulated in Table 3 and plotted in FIG. 12. In general, a CWG may be very efficient, only losing power due to the resistance of non-ideal diodes. The experiment discussed here demonstrated that $\eta_{total,diff} = \sim 68\%$, with efficiency falling off slightly for higher breakdown voltages (larger gap spacings) due to increased current leaks via corona discharges to the surrounding air (which may be addressed by, e.g., potting the circuit, minimizing exposed metal, etc.).

Figure 13:
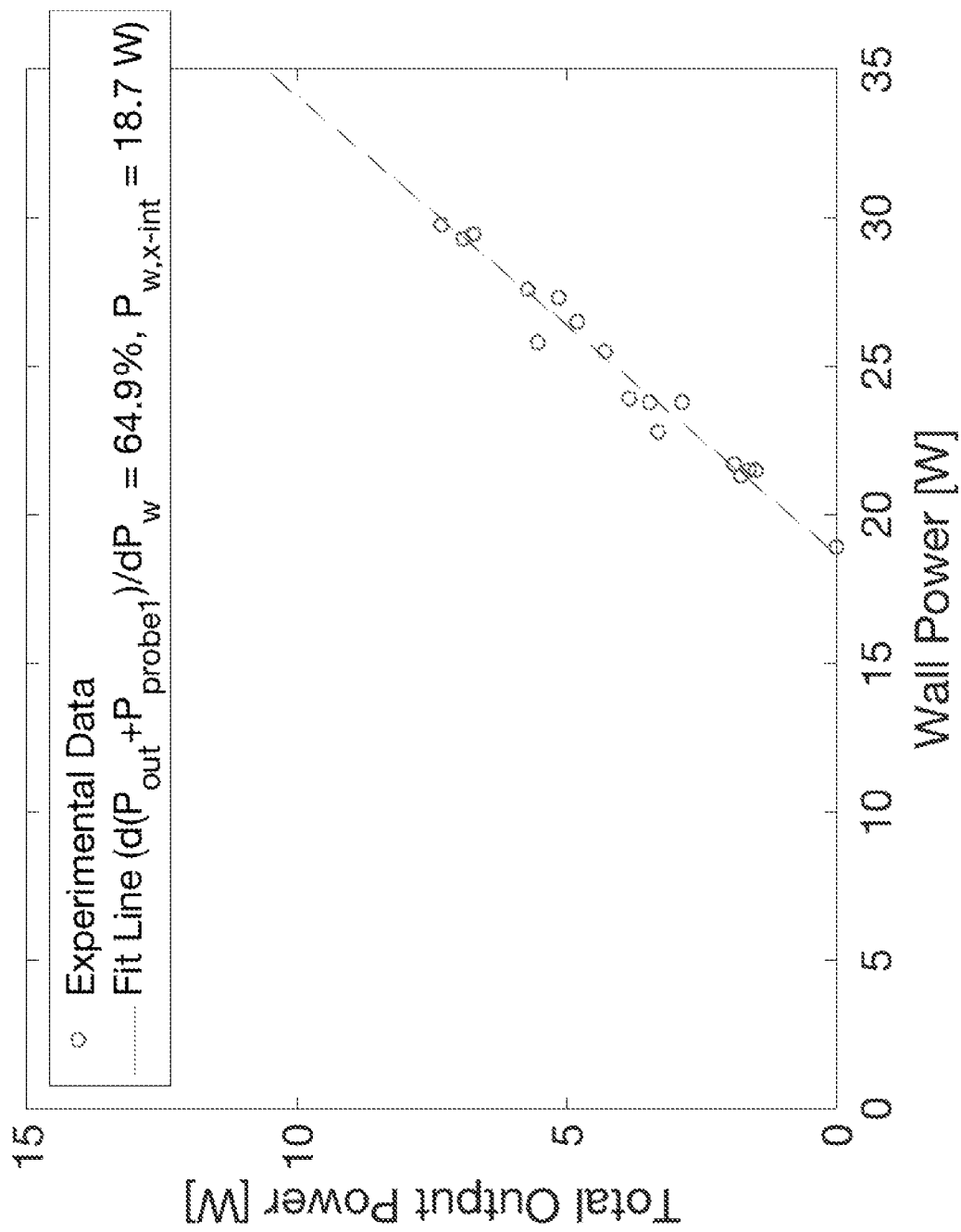
FIG. 13 provides an example plot of total usable output power ($P_{out}+P_{probe1}+P_{RQ}$) as a function of wall power for the circuit of FIG. 8. The slope of the linear fit line is representative of differential efficiency of the full circuit.

An alternate method for quantifying total differential efficiency of this setup is to plot total output power $P_{out} + P_{probe1} \pm P_{RQ}$) as a function of input wall power, as shown in FIG. 13. This plot is strongly linear, as would be expected. The slope of the resulting fit line, $dP_{out,tot}/dP_w$, is equal to the differential efficiency of the full setup, and was found to be 64.9%. This value is in good agreement with the total differential efficiency values found via $(P_{out} + P_{probe1})/(dP_w/N_{CWG})$, shown in Table 3 below (which provides tabulated experiment results) and FIG. 13.

TABLE 3

| Gap ID | Date | Gap Spacing [mm] | $(dP_w/N_{CWG})$ [W] | $V_{b,avg}$ [kV] | $V_{b,max}$ [kV] | $E_{pulse,avg}$ [mJ] | $f_{avg}$ [Hz] | $P_{out}$ [W] | $P_{probe1}$ [W] | $P_{RQ}$ [mW] | $\eta_{total,diff} = (P_{out} + P_{probe1})/(dP_w/N_{CWG})$ |
|---|---|---|---|---|---|---|---|---|---|---|---|
| A | March 4 | 2.7 | 2.09 | 10.6 | 13.5 | 15.6 | 87.6 | 1.37 | 0.116 | 1.4 | 71.1% |
| B | March 4 | 2.7 | 2.09 | 10.8 | 14.9 | 12.6 | 92.2 | 1.26 | 0.113 | 1.3 | 65.8% |
| C | March 4 | 2.7 | 2.09 | 10.1 | 12.1 | 12.5 | 105.7 | 1.32 | 0.092 | 1.7 | 67.8% |
| D | March 4 | 2.7 | 2.09 | 10.9 | 15.5 | 18.6 | 71.8 | 1.34 | 0.106 | 1.3 | 68.9% |
| March 4 Average | | 2.7 | 2.09 | 10.9 | 14.0 | 14.8 | 89.3 | 1.32 | 0.107 | 1.4 | 68.4% |
| A | March 5 | 3.2 | 2.25 | 11.9 | 17.7 | 16.5 | 89.0 | 1.47 | 0.134 | 1.4 | 71.3% |
| B | March 5 | 3.2 | 2.25 | 13.2 | 17.7 | 20.0 | 75.9 | 1.52 | 0.171 | 1.3 | 75.2% |
| C | March 5 | 3.2 | 2.25 | 12.0 | 16.1 | 16.0 | 94.4 | 1.51 | 0.133 | 1.6 | 73.1% |
| D | March 5 | 3.2 | 2.25 | 12.6 | 16.1 | 20.6 | 79.0 | 1.63 | 0.138 | 1.7 | 78.4% |
| March 5 Average | | 3.2 | 2.25 | 12.4 | 16.9 | 18.3 | 84.6 | 1.53 | 0.144 | 1.5 | 74.5% |
| A | March 6 | 4.6 | 2.86 | 15.5 | 20.5 | 20.5 | 52.2 | 1.65 | 0.240 | 1.2 | 66.1% |
| B | March 6 | 4.6 | 2.86 | 16.5 | 20.6 | 20.6 | 53.7 | 1.72 | 0.229 | 1.2 | 68.2% |
| C | March 6 | 4.6 | 2.86 | 14.9 | 18.9 | 18.9 | 60.2 | 1.41 | 0.262 | 1.0 | 58.5% |
| D | March 6 | 4.6 | 2.86 | 16.3 | 19.8 | 19.8 | 45.3 | 1.54 | 0.252 | 1.1 | 62.8% |
| March 6 Average | | 4.6 | 2.86 | 15.8 | 20.0 | 30.3 | 52.8 | 1.58 | 0.246 | 1.1 | 63.9% |
| A | March 7 | 5.0 | 2.61 | 15.6 | 21.2 | 21.2 | 48.1 | 1.49 | 0.277 | 1.0 | 67.6% |
| B | March 7 | 5.0 | 2.61 | 17.2 | 21.3 | 21.3 | 40.9 | 1.35 | 0.324 | 0.8 | 64.2% |
| C | March 7 | 5.0 | 2.61 | 17.3 | 22.0 | 22.0 | 39.3 | 1.37 | 0.329 | 0.8 | 65.0% |
| D | March 7 | 5.0 | 2.61 | 17.0 | 20.2 | 20.2 | 39.3 | 1.48 | 0.292 | 1.0 | 68.0% |
| March 7 Average | | 5.0 | 2.61 | 16.8 | 21.2 | 34.1 | 41.9 | 1.42 | 0.306 | 0.9 | 66.2% |

Figure 15A:
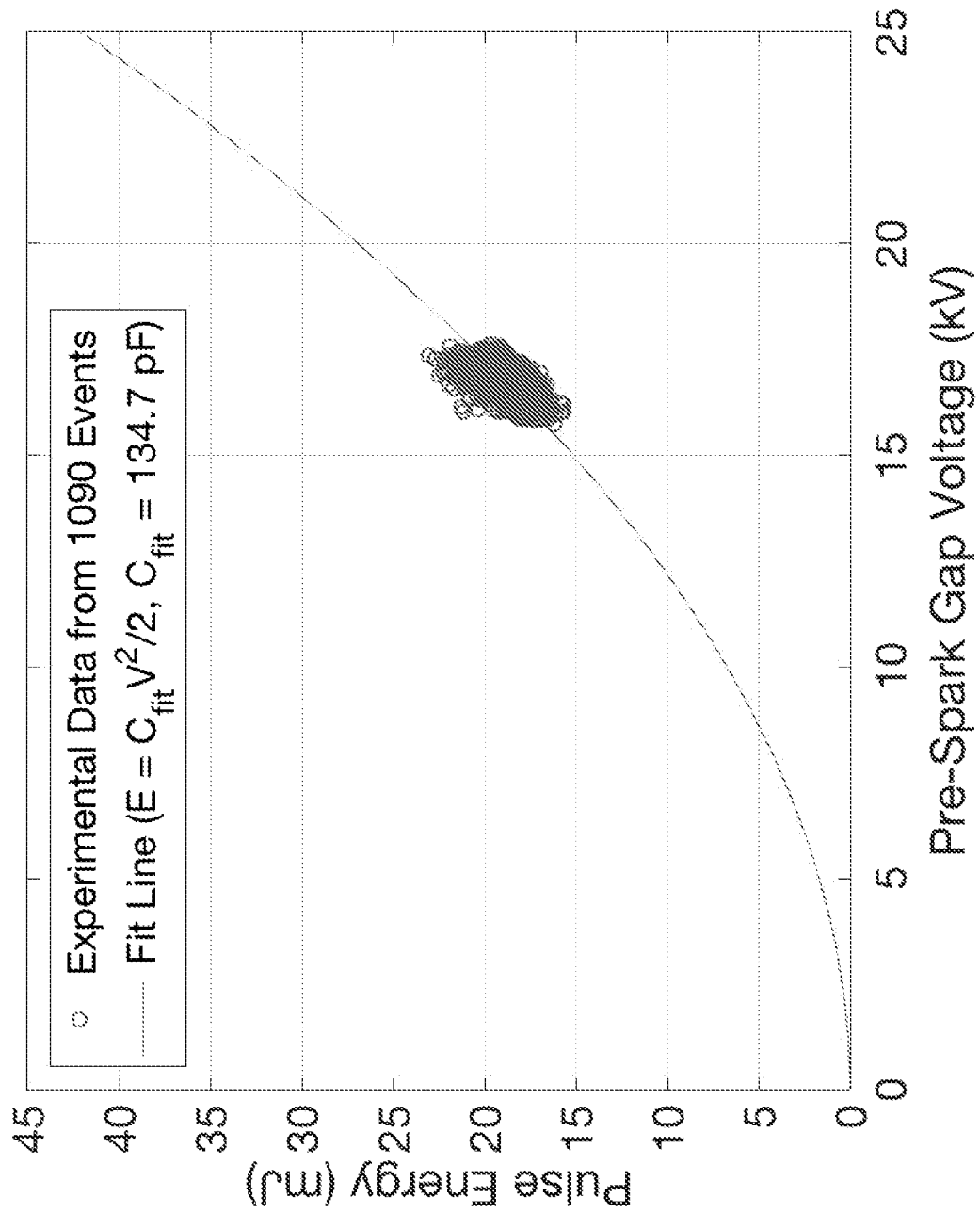
FIGS. 15A-15B provide scatter plots of pulse energy as a function of breakdown voltage for the circuit depicted in FIG. 14, powering a ~5-mm gap (15A) and a ~1-mm gap (15B) (see Example 2). Compare to FIG. 9. $C_1$=70 pF, $C_Q$=0.57 pF, and $R_Q$=22.3MΩ.
Figure 15B:
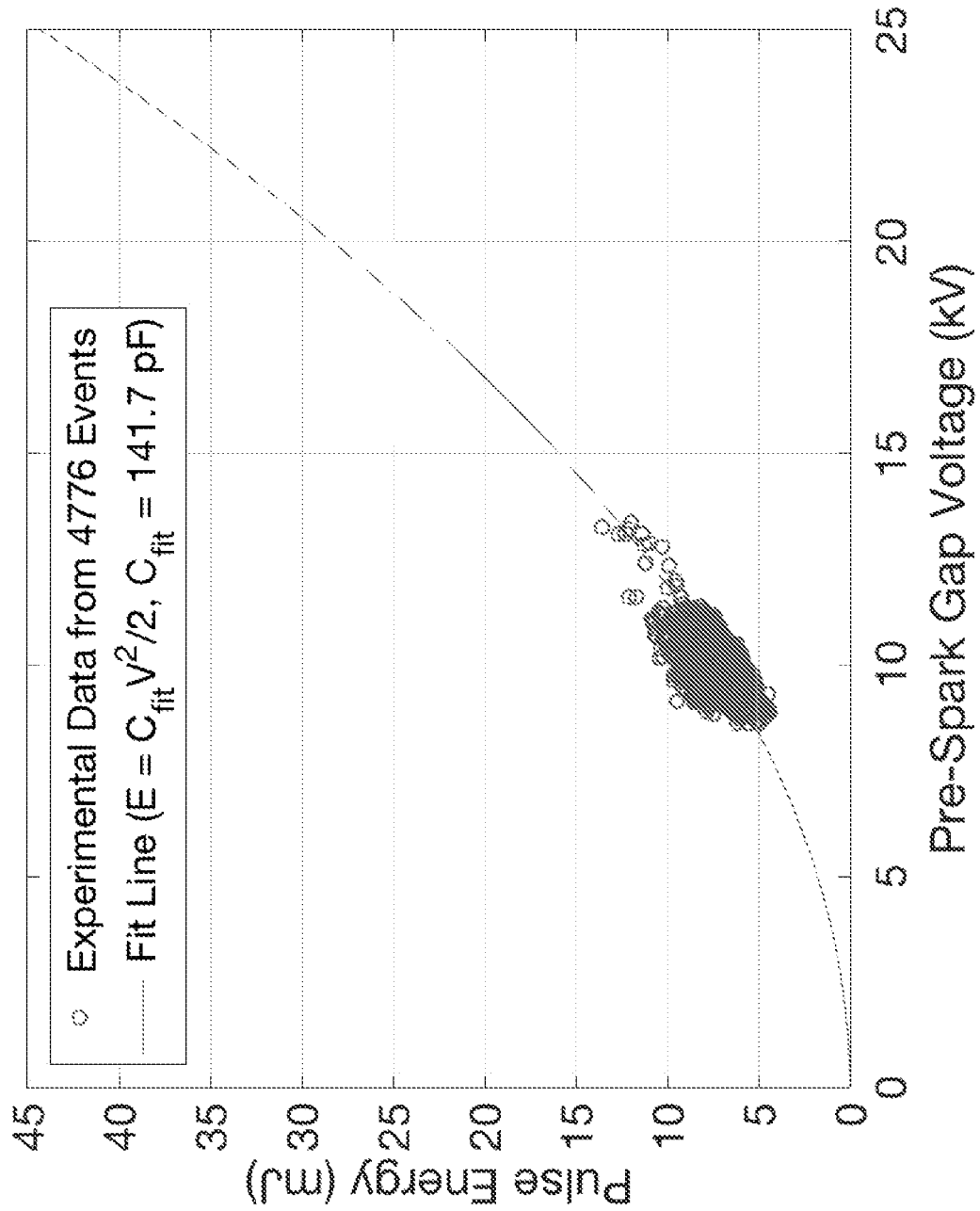
Figure 16:
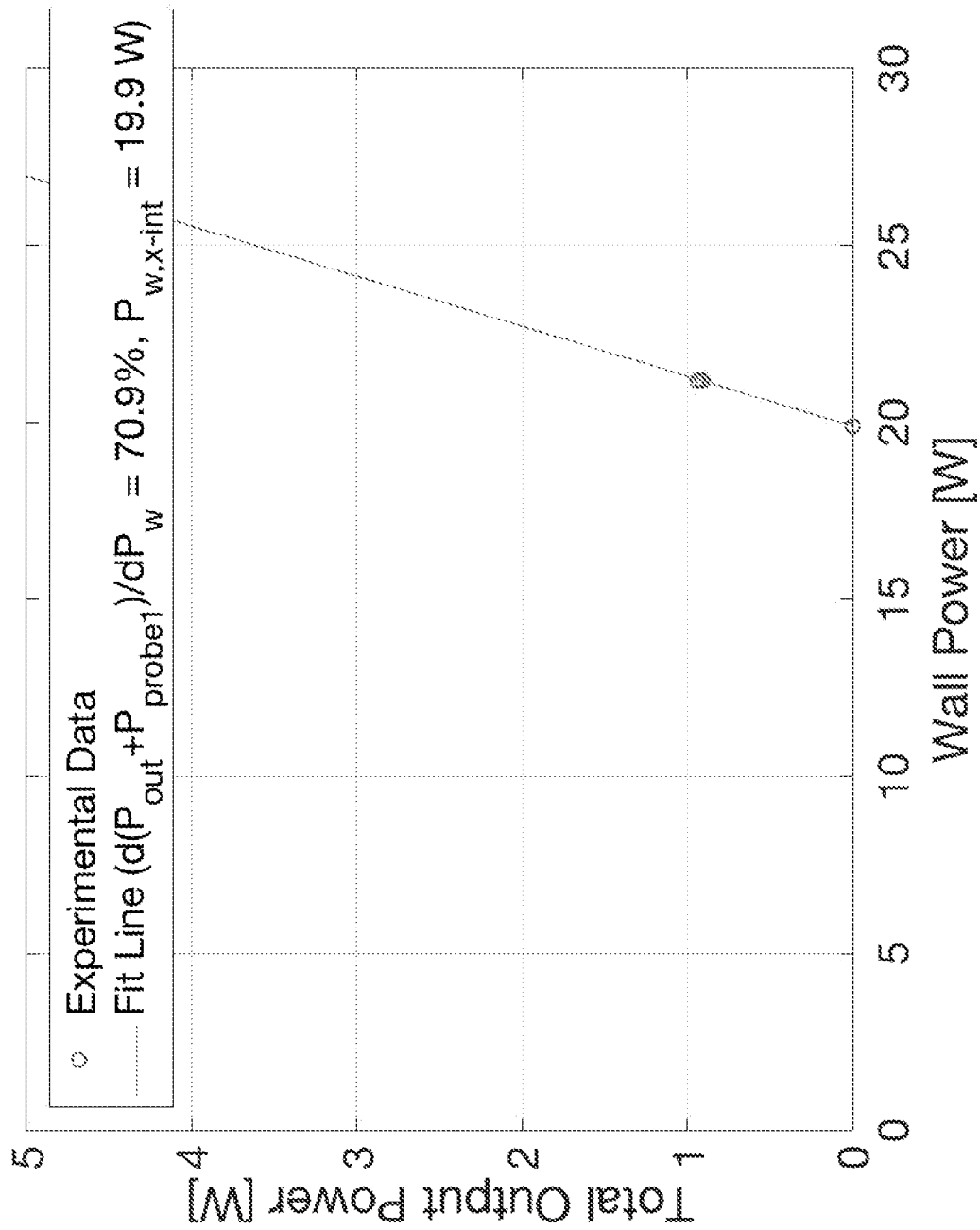
FIG. 16 provides an example plot of total usable output power ($P_{out}+P_{probe1}+P_{RQ}$) as a function of wall power for the circuit shown in FIG. 8. The slope of the linear fit line represents differential efficiency of the full circuit. Compare to FIG. 13.

An example efficiency analysis for a full-wave CWG-powered spark gap will now be provided. Similar power and energy-per-pulse measurements were carried out using a full-wave single-stage Cockcroft-Walton generator (see FIG. 14) in order to determine efficiency. This example circuit includes two connected Cockcroft-Walton subcircuits powered by opposite polarity inputs from the same transformer, allowing for the full AC cycle to contribute to capacitor charging. These results (FIGS. 15 and 16) are directly comparable to the half-wave circuit results detailed in FIGS. 9 and 13, showing that the difference in differential efficiency between the full-wave circuit (FIG. 14) and the half-wave circuit is minor (<5%).

Figure 14:
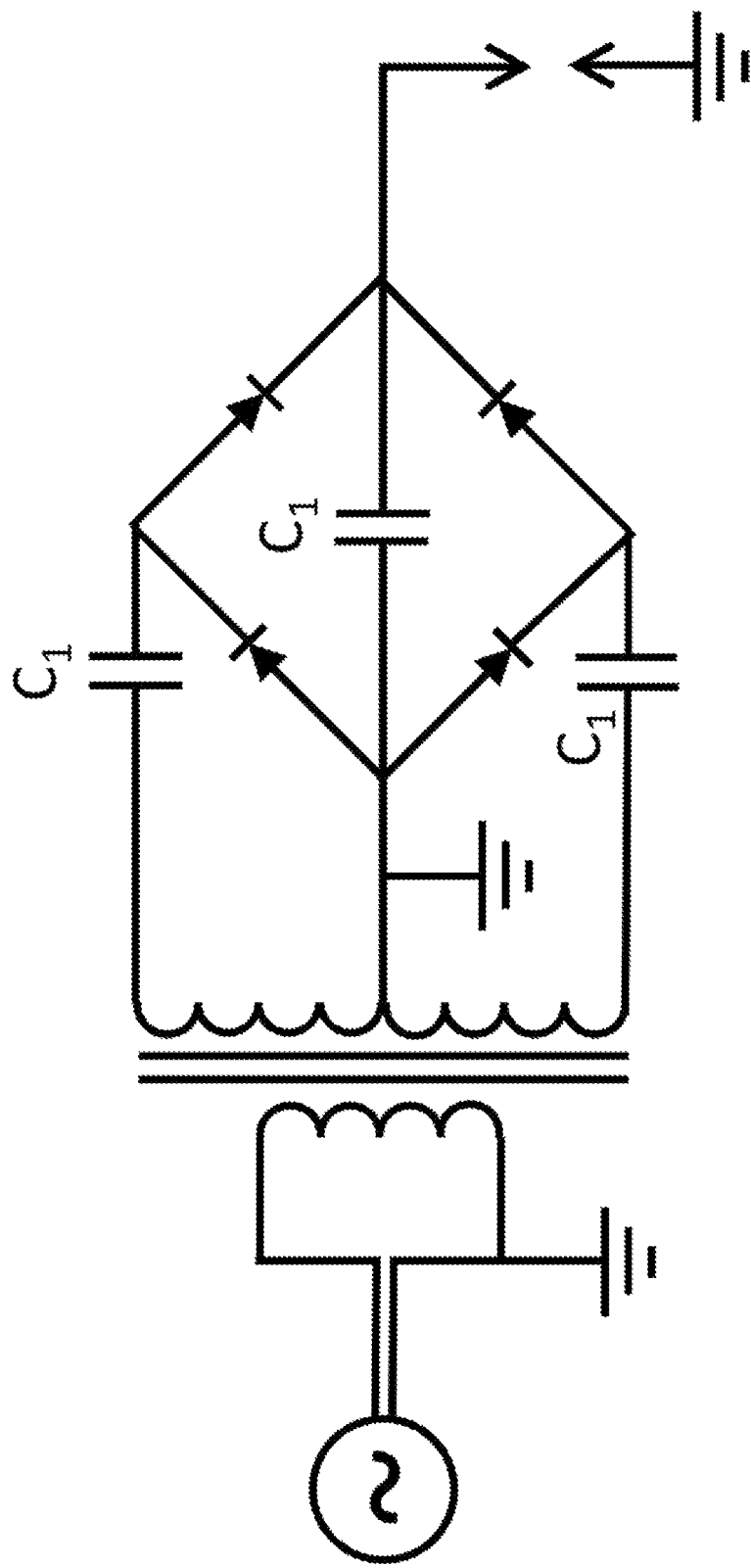
FIG. 14 provides an example circuit diagram for a full-wave single stage Cockcroft-Walton generator.
Figure 17:
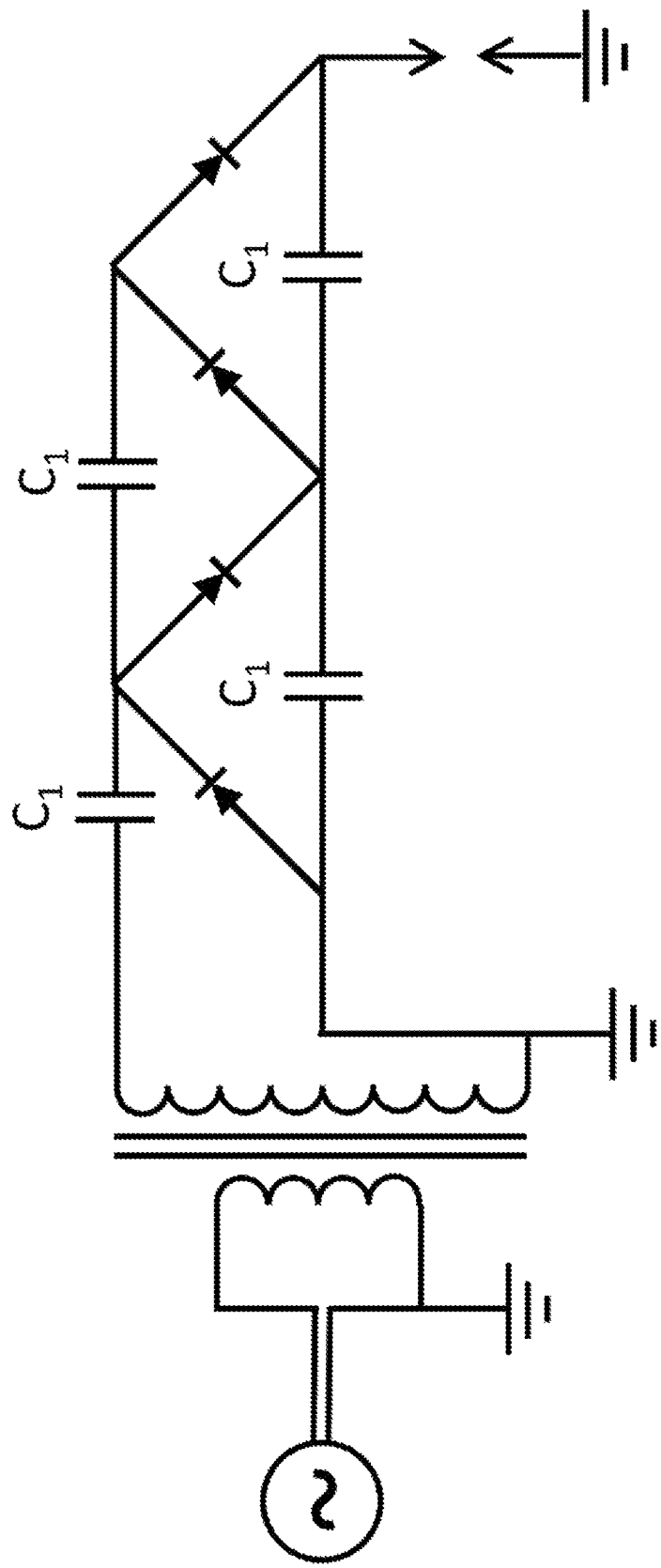
FIG. 17 provides an example circuit diagram for an example half-wave two-stage Cockcroft-Walton generator.
Figure 18:
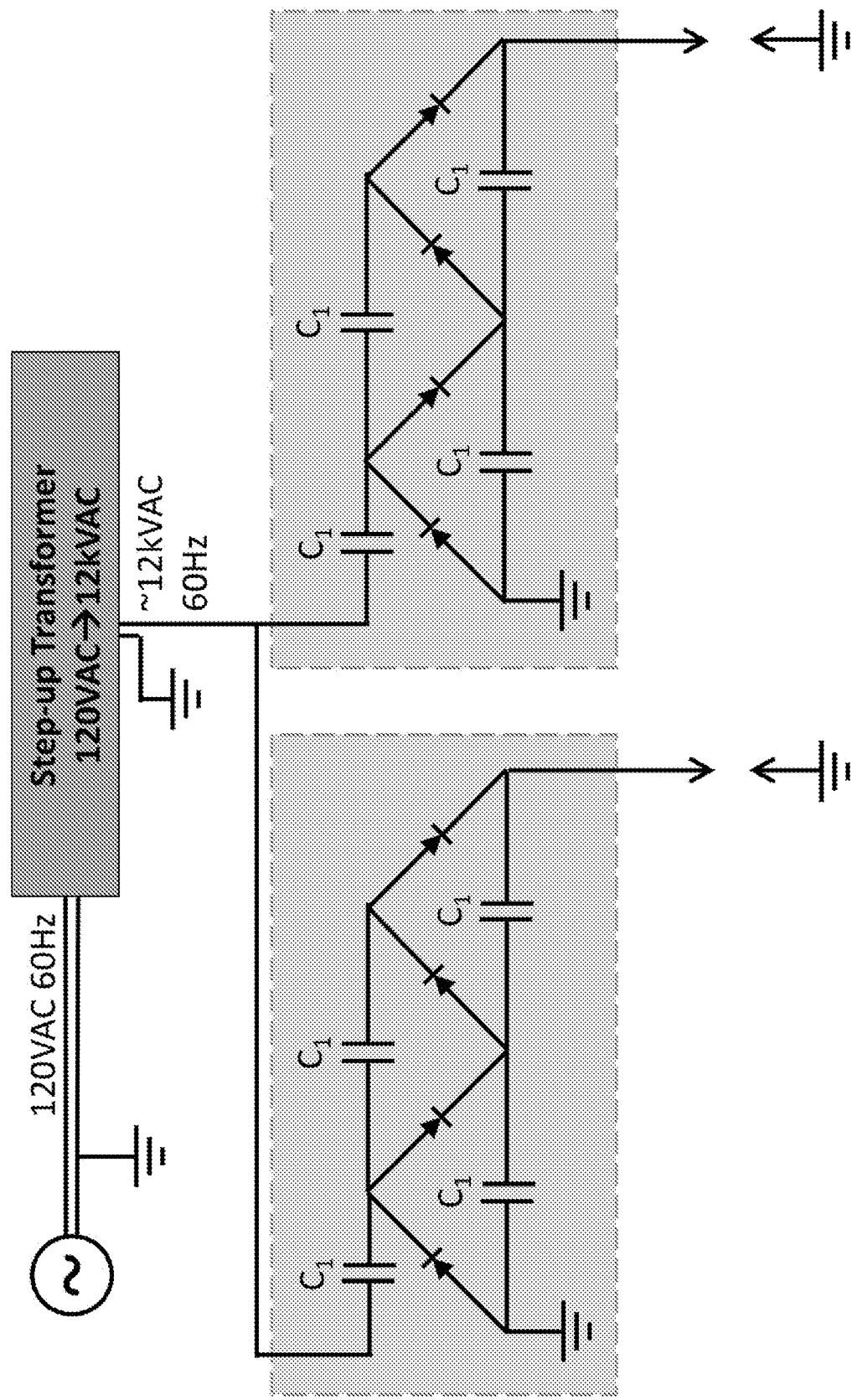
FIG. 18 provides an example circuit diagram for two two-stage Cockcroft-Walton generators operating in parallel off of a single step-up transformer.
Figure 19A:
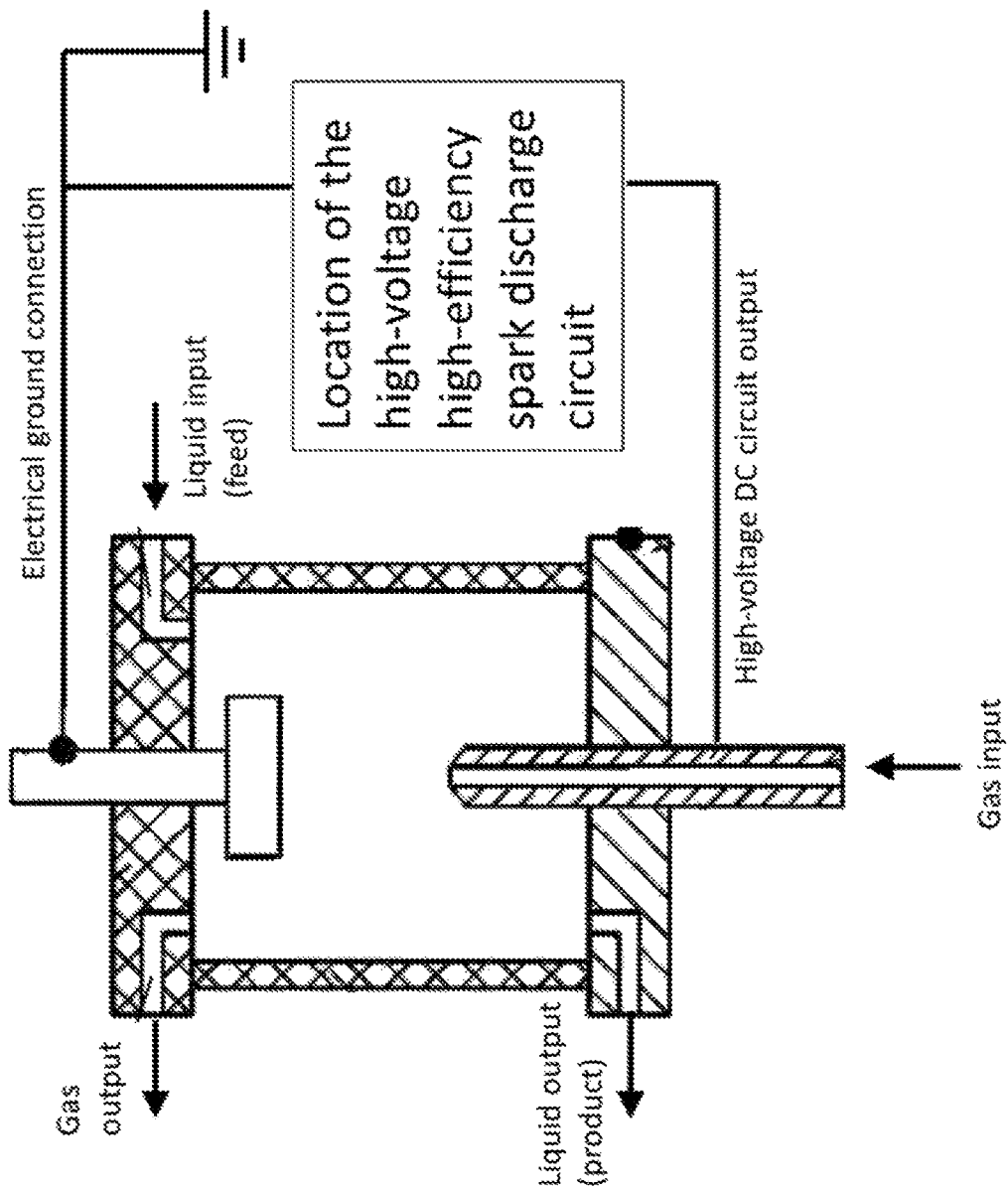
FIGS. 19A-19B provides a general example of how any possible spark discharge circuit may be implemented in the oil treatment reactor (19A), along with an embodiment of such an implementation which uses a single-stage CWG paired with a AC power supply to power the spark discharge (19B).
Figure 19B:
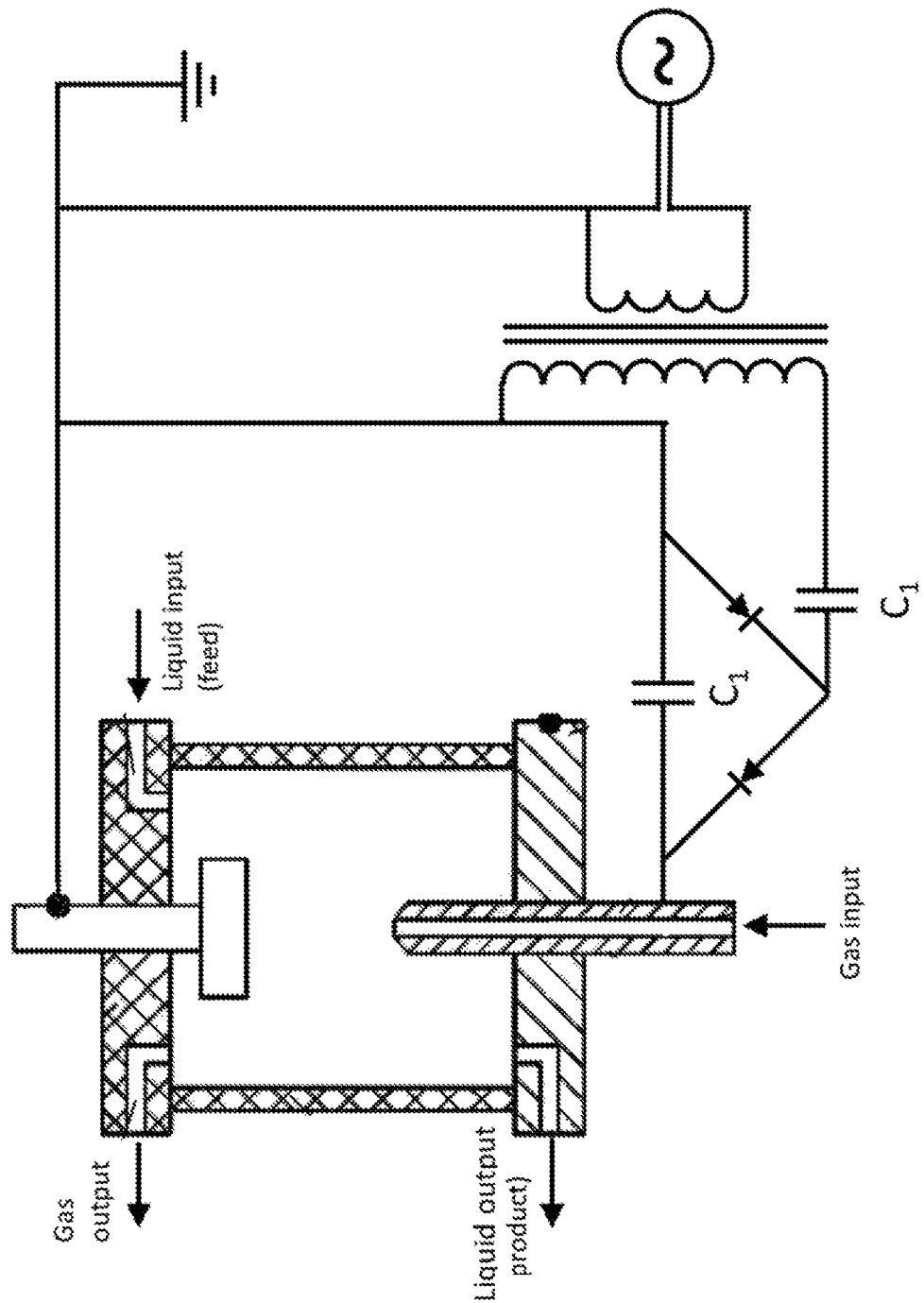

In example configurations alternate to those represented in FIGS. 8 and 14, the disclosed techniques of generating high-voltage pulses for use in hydrocarbon conversion covers all variants of the T+CWG circuit, such as those depicted in FIGS. 17 and 18. Major design parameters include: (1) number of CWG-powered spark gaps operating in parallel off of a single transformer; number of stages (2 capacitors+2 diodes) present in each CWG ($V_{DC}=N_{stages}V_{pp}$); and (3) full-wave or half-wave configurations. In various implementations, any combination and variation of the above parameters may be used.

In order to create a hydrocarbon conversion process which is cost-effective, an efficient electrical circuit is desirable. Such a circuit preferably loses minimal input energy as heat (dissipative loss) or unwanted charge leakage (charge transfer loss), exerting most of its energy on the material between the two discharge electrodes via chemical processes. In the case of hydrocarbon conversion, for example, this material may be a two-phase combination of heavy hydrocarbons and a chosen hydrogen donor gas (e.g. $H_2$, $CH_4$). In various embodiments, to target the specific chemical reactions which will lead to desired conversion with minimal soot production, relatively small pulse energies are used (~30 mJ or smaller). In various implementations, the circuit may also be relatively compact to ease implementation into the full reactor system, and may have a self-repeating design to aid in reactor scale-up. Regarding efficiency, in some implementations, a diminishing returns effect may be expected when improving electrical efficiency of the circuit. For example, an increase from 30% to 50% efficiency may contribute much more to cost-effectiveness of the hydrocarbon conversion process than does an increase from 70% to 90%. For certain implementations discussed here, it may be assumed that a circuit efficiency of ~60% or higher will be suitable.

Figure 2A:
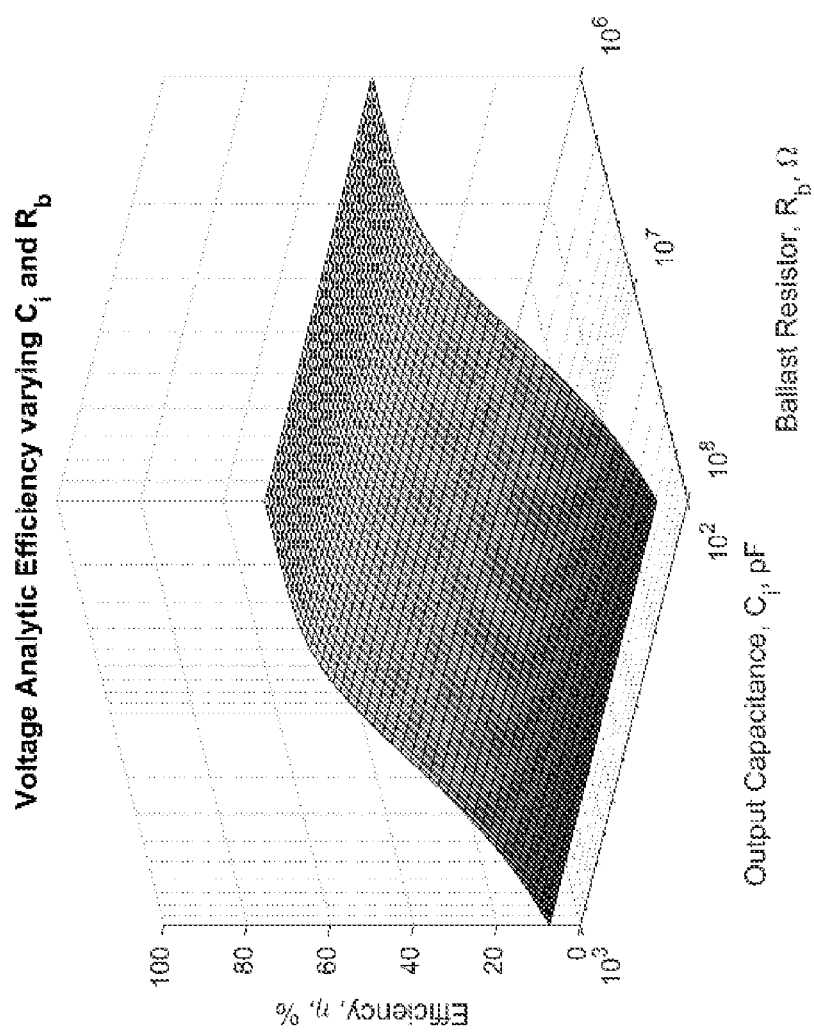
FIGS. 2A and 2B provide example circuit efficiency as a function of power supply internal capacitance $C_i$ and ballast resistance $R_b$, for voltage-controlled (2A) and current-controlled (2B) non-ideal cases.
Figure 2B:
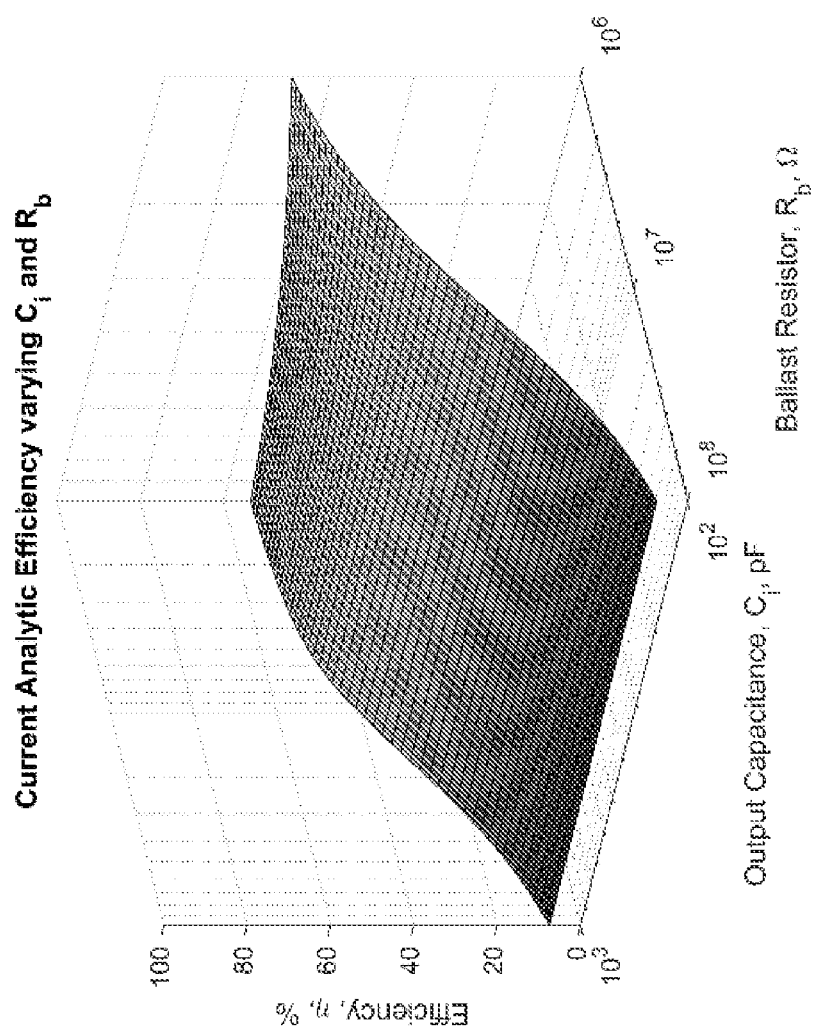
Figure 3E:
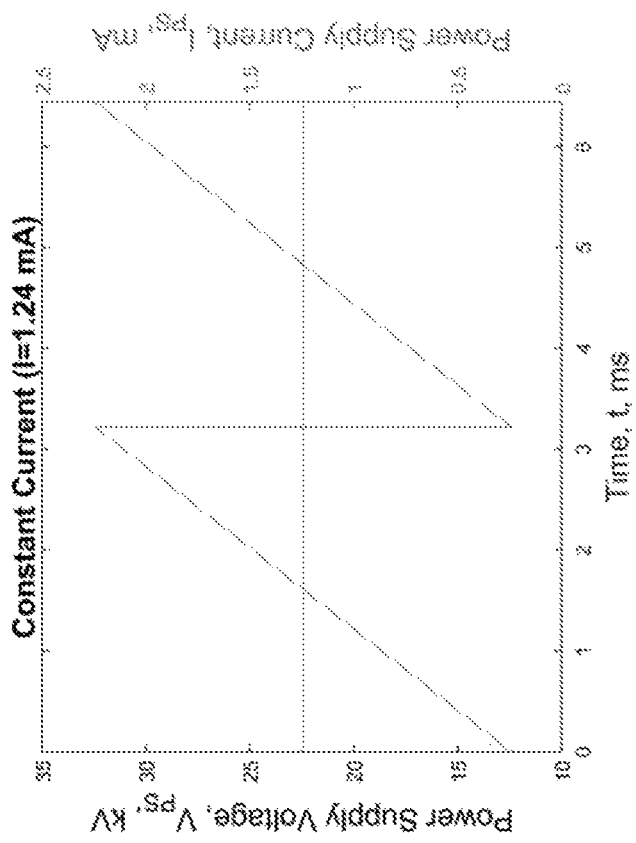
FIGS. 3A-3H provide example constant voltage (3A-3D) and constant current (3E-3H) time response comparisons for example RC circuits.
Figure 3A:
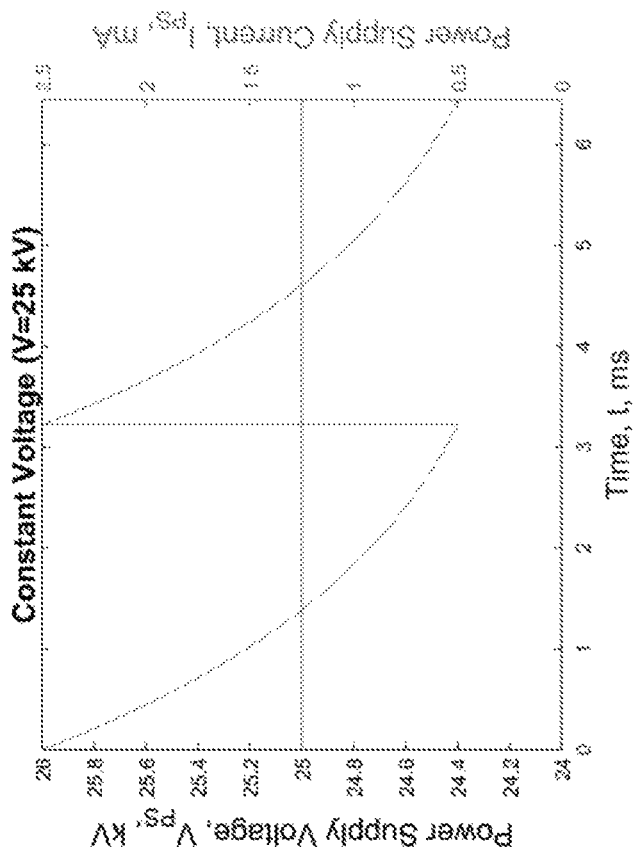
Figures 3B, 3F:
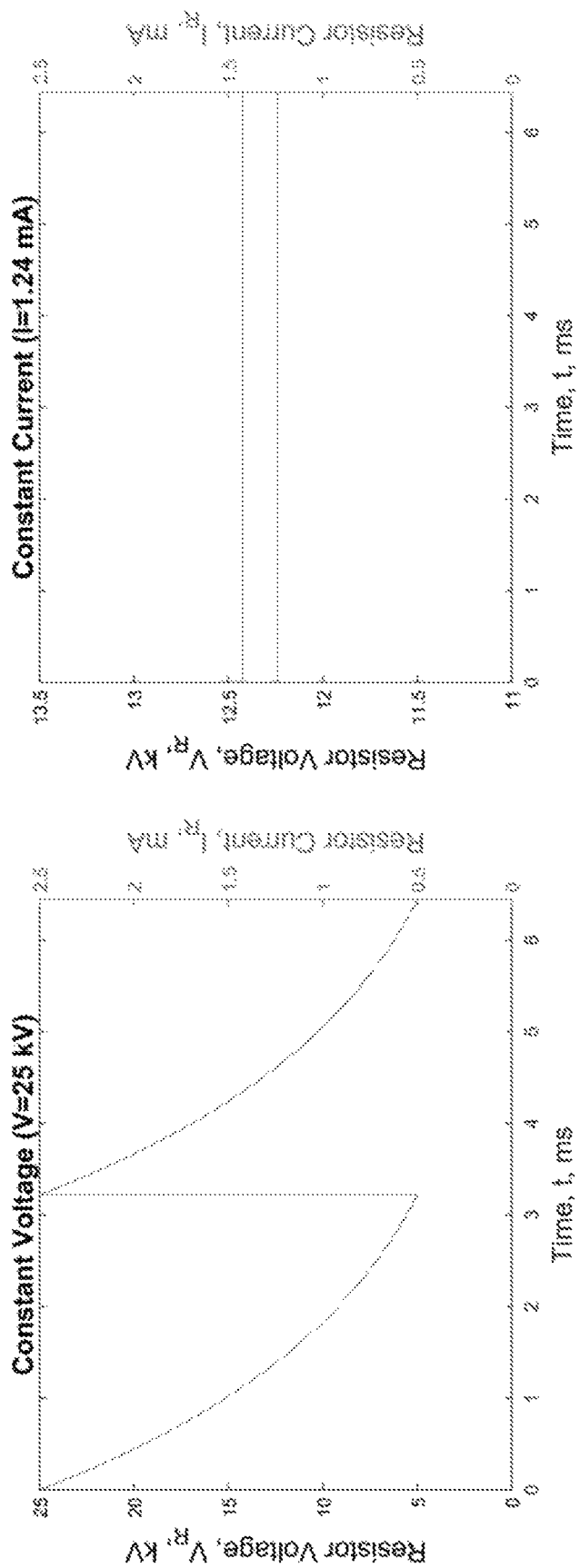
Figure 3G:
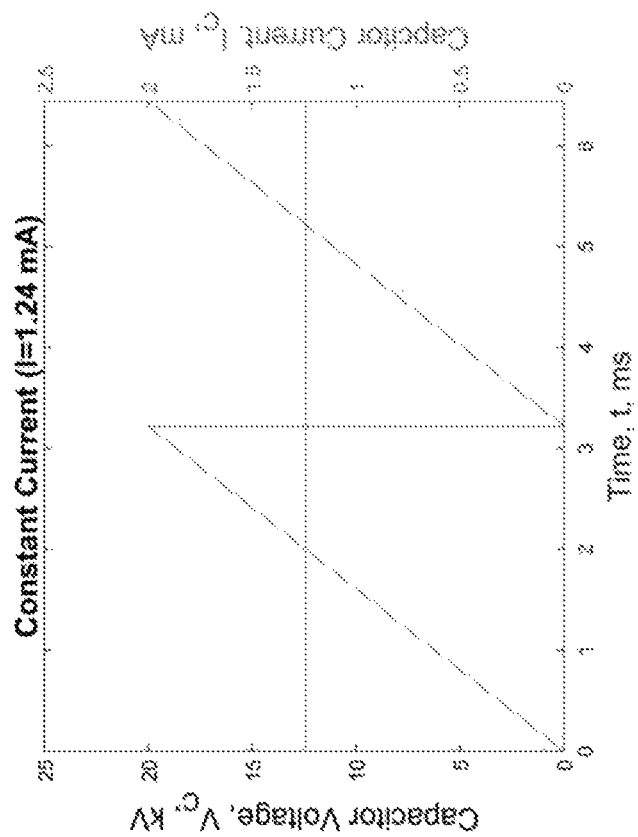
Figure 3C:
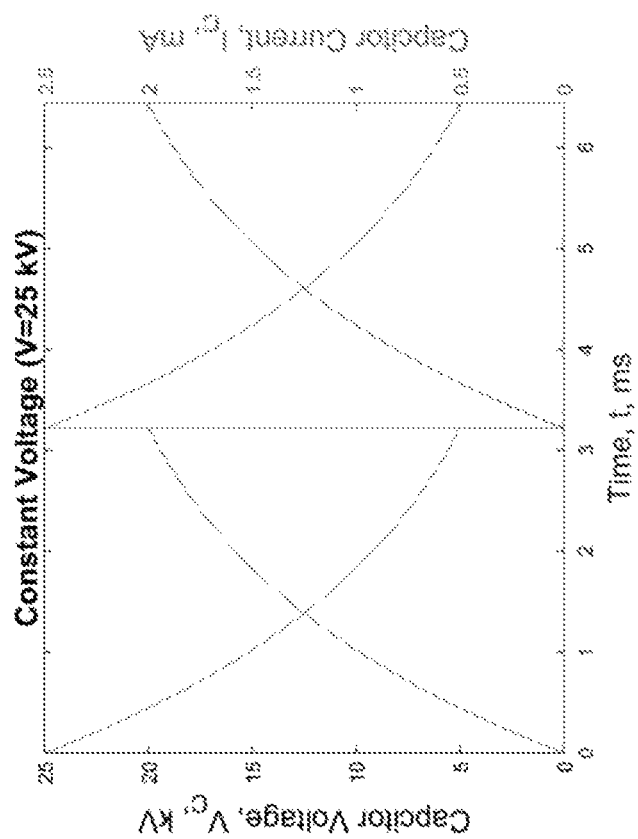
Figure 3H:
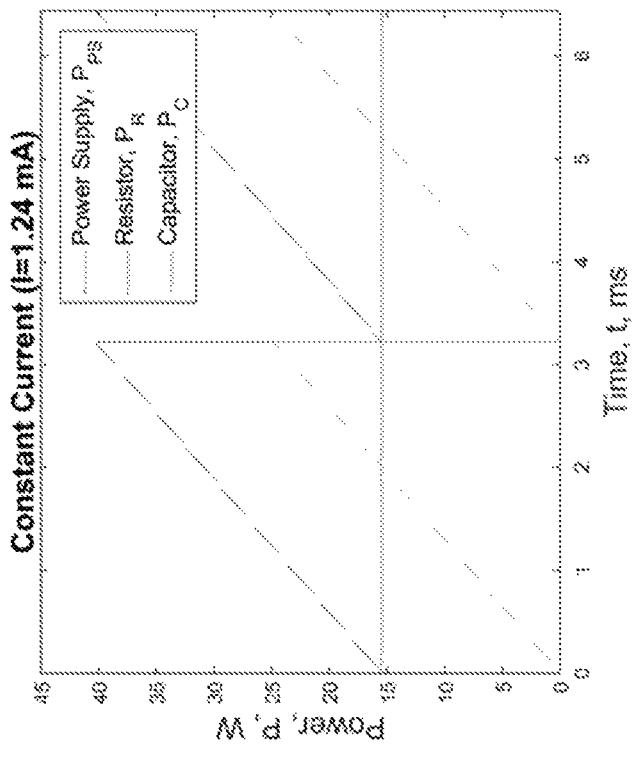
Figure 3D:
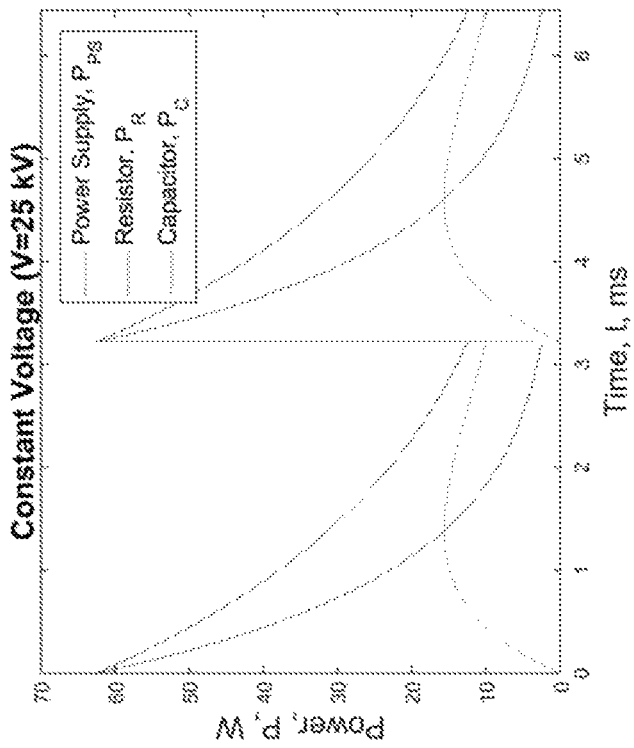

Returning to FIG. 1, a basic example of a circuit which can be used for this application is the simple RC circuit that uses either a voltage-controlled (a) or current-controlled (b) DC power supply to charge a single high-voltage capacitor until the capacitor's voltage exceeds the current breakdown voltage of a spark gap, at which point a spark event occurs and the capacitor is equalized. A ballast resistor is typically included in series with the DC supply for mitigation of spark-induced damage. A computational model for this circuit revealed that using a voltage-controlled power supply, the maximum possible energy efficiency achievable when changing an RC circuit is 50%, even in the limit of small ballast resistance and minimal overvolting ($V_{overvoltage}=V_s-V_b$ where $V_s$ is the constant supply voltage and $V_b$ is the breakdown voltage). However, in various implementations, using a current-controlled power supply it is possible to approach 100% energy efficiency, in the limits of both small charging current (or small input power) and small ballast resistance (see FIG. 5). This result also holds for the non-ideal RC spark discharge circuit (FIG. 2).

In some implementations, an RC circuit operating with these extreme parameters for efficiency maximization is not practical for the intended application, since pulsing frequency is proportional to charging current (according to $$f = \frac{I_s}{C_1 V_b}$$

where $I_s$ is the set charging current and $C_1$ is the charging capacitance). Also, commercially-available high-voltage current-controlled power supplies are generally not optimized for efficiency. Nevertheless, this result has important implications for all possible high-efficiency circuit designs which operate by discharging energy stored in capacitors. In general, potentially complex spark discharge circuits can be regarded as having some equivalent capacitance which provides energy for each spark event as well as some equivalent resistance which leads to dissipative loss. Therefore, based on results from the aforementioned computational model, the current-controlled version of any spark discharge circuit will be inherently more efficient than its voltage-controlled counterpart. This applies to power-limited circuits as well, which as approximately current-limited when a voltage-controlled circuit reaches its power limit.

An example circuit configuration which approaches the requirements of various applications is the CWG discussed above. This circuit rectifies AC input using a "ladder" of high-voltage diodes and capacitors in order to produce high-voltage DC output which can be connected directly to a spark gap (FIG. 7). In this case, the capacitors in this rectifying circuit make up the total capacitance $C_{equiv}$ discharged during a spark event of energy $E_{spark}$, according to $$E_{spark} = \frac{1}{2}C_{equiv}V_b^2$$

where $V_b$ is the breakdown voltage (equal to the voltage stored on the total rectifying subcircuit immediately prior to a spark event). In the ideal case, the diodes and capacitors in this circuit have zero dissipative loss (via ohmic heating) and can therefore approach 100% efficiency. Also, in various applications, for a CWG the maximum possible pulsing frequency is equal to the driving frequency of the AC input (e.g. 60 Hz using line input). When the circuit is sparking at this frequency, with an average energy per pulse of $$E_{spark} = \frac{1}{2}C_{equiv}V_b^2,$$

its average output power is limited according to $P_{out}=E_{pulse}f$. Therefore, the CWG circuit benefits from the aforementioned advantages of current-controlled and power-limited spark discharge circuits. The experimental evidence provided in this disclosure supports this claim, showing that the differential efficiency of such a CWG spark discharge circuit is greater than 50%, which is not possible in a voltage-controlled system. In some implementations, several single-stage CWGs can be combined in parallel to further increase the final DC output voltage $V_{out}$ of the resulting multi-stage ladder, according to the relation $V_{out}=N_{stages}V_{pp,in}$ where $N_{stages}$ is the number of stages and $V_{pp,in}$ is the peak-to-peak voltage of the AC input. For example, an ideal two-stage CWG operating off of a 10 kVAC (20 kV peak-to-peak) input voltage will produce 40 kVDC output voltage.

While, in certain implementations, the Cockcroft-Walton ladder could potentially be powered by a standard line input (e.g., 120 VAC), the number of CWG stages required to rectify this input up to the high DC voltages required for hydrocarbon conversion (~30 kV) would be relatively large. For example, 125 stages would be needed to convert 120 VAC to 30 kVDC ($N_{stages}=V_{out}/V_{pp,in}$), not accounting for losses or voltage sagging. To address this issue, in various implementations, a step-up voltage transformer can be used. In general, from AC input a step-up transformer can generate a higher-voltage (potentially kV) AC output at high efficiency (also due to the lack of elements which exhibit ohmic heating). By using this output kVAC voltage from the transformer as the input for a CWG ladder (T+CWG), it is possible to reach ~30 kVDC using significantly fewer CWG stages than with direct line input while still maintaining high efficiency. This concept implies a parameter space of possible T+CWG configurations with various different transformer turning ratios and CWG stage numbers. Also, it is worth noting the alternate full-wave configuration of the Cockcroft-Walton generator (FIG. 14) which could be used in this manner, in which both the positive-polarity and negative-polarity peaks contribute to charge transfer but requires a transformer with dual outputs of opposite polarity.

In various embodiments, the T+CWG configuration of a single step-up transformer and single CWG ladder powering a single spark gap implies the possibility of scale-up using a single T+CWG circuit to power several spark gaps. However, simply connecting a single CWG to several spark gaps will not operate as intended in various applications; such a system would spark across the spark gap with the lowest breakdown voltage exclusively. In certain implementations, the configuration of the T+CWG circuit which solves this issue consists of a single step-up transformer powering several CWG ladders (1 CWG ladder per spark gap). Each CWG in this configuration (T+NCWG) provides an independent high-voltage DC output without requiring its own dedicated transformer and would be able to power a single spark gap without being affected by the breakdown voltages of the other spark gaps on the same circuit. In general, step-up transformers operate more efficiently near their power limit, therefore a relatively high-power transformer (e.g. ~1 kW) can potentially power several hundred CWG spark gaps at once (~2 W per spark gap) off of line input power. Additionally, in various versions, a three-phase line input can also be used to power this circuit (previous discussions focused on single-phase line input). Using three-phase input, a three-transformer system can be created using the aforementioned circuit design, with one transformer connected to each of the three phases of input, resulting in three T+NCWG circuits operating simultaneously at phase delays of one third of one cycle. Also, in certain implementations, due to the relative simplicity and compactness of the CWG ladder (2 capacitors and 2 diodes, possible to fit within a 1.5"×2.5"×0.5" bounding volume), the full circuit could be easily implemented in a full reactor system and could be easily scaled (one CWG ladder per spark gap).

The T+NCWG circuit provides various possible embodiments of a spark discharge circuit which lends itself well to different applications in hydrocarbon conversion (efficiency, compactness, easy scalability, low pulse energy, >30 kVDC output voltage, current-controlled). However, in various alternative implementations, other circuit designs may be used, as disclosed herein.

It is noted that low output capacitance is an important characteristic of example embodiments of the disclosed approach. Typical high voltage power supplies have relatively high output capacitances (e.g. ~1 nF) in order to reduce ripple. However, nanofarad output capacitances may be too high for various chemical processing implementations, which may not be sensitive to circuit ripple. In specific applications of processing using pulsed electrical discharges, capacitance is of great consequence. Capacitance linearly affects energy per pulse, and low energy per pulse at high voltage is advantageous to the plasma-chemical process. Therefore, the total capacitance of the circuit (which depends on the total output capacitance of the power supply) should be minimized in certain implementations. For example, a spark discharge generated by a circuit with capacitance of 100 pF across a gap with breakdown voltage of 20 kV will have a pulse energy of 20 mJ. This may be sufficient for some applications, but energy per pulse could still theoretically be reduced further by decreasing capacitance. This is generally done via selection of commercially-available high-voltage capacitors with smaller capacitances, but it may also be possible to construct embodiments of this circuit (CWG or otherwise) which utilize stray capacitance, which is typically on the order of tens of picofarads for circuits of this scale.

In example versions, the example circuits discussed above may be used in pulsed plasma systems (e.g., nanosecond-duration spark discharges) for processing crude oil. A circuit charges a capacitor and then discharges the stored electrical energy through a spark gap into crude oil with a gas bubbling through it. The spark breaks some bonds in the crude oil making some of the long carbon chains shorter. The disclosed approach could be used as a partial upgrader for crude oil (i.e., it can be used to begin the process of processing crude oil and turning it into other useful products such as gasoline). The apparatus may, for example, be used to reduce the viscosity of the crude oil, which makes it easier to flow. As a result less diluent or possibly no diluent would be needed for the oil to be placed into a pipeline and shipped, which would reduce the cost of crude oil.

Although the disclosure has focused on conversion of hydrocarbons and mixtures thereof, the disclosed approach is also applicable to treatment of other compounds. In various implementations, the systems and methods disclosed may be applied to treatment of other mixtures and compounds so as to, for example, decontaminate water and/or food.

The term hydrocarbon material or mixture to be treated may refer to those hydrocarbon compounds, and mixtures thereof, which are fluids at atmospheric conditions. The liquid hydrocarbon materials may be liquids that optionally have solids suspended therein. The liquid hydrocarbon materials may contain other conventional additives, including, but not limited to flow improvers, anti-static agents, anti-oxidants, wax anti-settling agents, corrosion inhibitors, ashless detergents, anti-knock agents, ignition improvers, dehazers, re-odorants, pipeline drag reducers, lubricity agents, cetane improvers, spark-aiders, valve-seat protection compounds, synthetic or mineral oil carrier fluids and anti-foaming agents. Illustrative liquid hydrocarbon materials include, but are not limited to, mineral oil; petroleum products such as crude oil, gasoline, kerosene and fuel oil; straight and branched chain paraffin hydrocarbons; cyclo-paraffin hydrocarbons; mono-olefin hydrocarbons; diolefin hydrocarbons; alkene hydrocarbons; and aromatic hydrocarbons such as benzene, toluene and xylene.

Where the liquid hydrocarbon material includes crude oil, the crude oil may contain hydrocarbons of a wide range of molecular weights and forms. For examples, the hydrocarbons may include, but are not limited to, paraffins, aromatics, naphthenes, cycloalkanes, alkenes, dienes, and alkynes. The hydrocarbons may be characterized by the total number of carbon atoms (C) and/or the amount of single (C—C), double (C=C) or triple (C≡C) bonds between carbon atoms. Due to the varied compounds present in crude oil, it is a feedstock that is well-suited to the described process. It may be used for readily generating light fractions, such as gasoline and kerosene, or heavier fractions such as diesel oil and fuel oil. The hundreds of different hydrocarbon molecules in crude oil may be converted, using the processes of the present technology, into components which can be used as fuels, lubricants, and as feedstocks in other petrochemical processes.

Without being bound by theory, in any of the above processes or embodiments, liquid hydrocarbon materials with a high carbon content may be cleaved into molecules having a lower carbon content, to form hydrocarbon fractions that are lighter (in terms of both molecular weight and boiling point) on average than the heavier liquid hydrocarbon materials in the feedstock. Again, without being bound by theory, it is believed that the splitting of the heavy molecules occurs via the severing of C—C bonds. For these molecules, the energy required to break a C—C bond is approximately 261.9 kJ/mol. This energy amount is significantly less than the energy required to break a C—H bond (364.5 kJ/mol).

The free radicals of hydrocarbons attract hydrogen atoms. The carrier gas may thus be provided in the process to serve as a hydrogen atom source. Suitable carrier gases, may include, but are not limited to, hydrogen-atom-containing gases. Illustrative carrier gases may include, but are not limited to, hydrogen, methane, natural gas, and other gaseous hydrocarbons. In any of the above embodiments, a mixture of such illustrative carrier gases may be employed.

Where the process is to be run continuously, the various stages or steps of the process may occur simultaneously or sequentially, such that the liquid hydrocarbon material is continuously fed to the discharge chamber as the product hydrocarbon fractions are exited from the chamber.

As set forth above, example processes may include generating a spark discharge plasma into a jet of gas in the inter-electrode discharge gap. The breakdown voltage of the carrier gas will be less than the breakdown voltage of the liquid, accordingly, the use of a jet of gas can be used at the same voltage level to generate longer discharge gap. Increasing the inter-electrode discharge gap, while reducing the corrosion effects of the process on the electrodes, increases the area of direct contact between the plasma discharge and treated liquid hydrocarbon material. Without wishing to be bound by any particular theory, it is believed that upon contact of the discharge plasma with the liquid hydrocarbon material in the inter-electrode discharge gap, the liquid hydrocarbon material may rapidly heat and evaporate to form a vapor. Thus, molecules of the liquid hydrocarbon material may be mixed with the carrier gas molecules and particles of the plasma formed therein. The plasma electrons may collide with the hydrocarbon molecules, thereby breaking them down into smaller molecules having one unsaturated bond, and being essentially free radicals, i.e. fragments of molecules having a free bond. Free radicals may also arise as a result of the direct interaction of fast moving electrons with the liquid walls formed around the plasma channel set up between the electrodes.

As noted above, various carrier gases known in the art can be used in the processes and apparatuses of the present technology. Exemplary carrier gases include, but are not limited to, helium, neon, argon, xenon, and hydrogen ($H_2$), among other gases. In some embodiments, the carrier gas is a hydrogen-containing gas, such as, but not limited to, water, steam, pure hydrogen, methane, natural gas or other gaseous hydrocarbons. Mixtures of any two or more such hydrogen-containing gases may be used in any of the described embodiment. Further, non-hydrogen containing gases, such as helium, neon, argon, and xenon may be used either as diluent gases for any of the hydrogen-containing gases, or they may be used with the liquid hydrocarbon materials, thus allowing the free radicals to terminate with one another instead of with a hydrogen atom from the carrier gas. From the standpoint of energy costs for the formation of one free hydrogen atom, in order to select a suitable carrier gas, the dissociation energy of various carrier or hydrogen-containing gases may be compared. Thus, for example, breaking the bond between the hydrogen atoms in a molecule of $H_2$ may require about 432 kJ/mol. For water vapor, the energy required to liberate a hydrogen atom is about 495 kJ/mol, whereas for removal of a hydrogen atom from a hydrocarbon molecule such as methane, about 364.5 kJ/mol may be required.

According to certain embodiments, carrier gas is methane. The use of methane, or natural gas, is beneficial not only in terms of the energy required to break bonds, but also due to its relatively low cost. By using methane, it is ensured that C—H bonds are broken to generate a hydrogen radical and a methyl radical, either of which may combine with larger hydrocarbon radicals in a termination step. In some embodiments, the carrier gas is methane, or a mixture of methane with an inert gas such as helium, argon, neon, or xenon.

Various types of electric discharges can be used to produce plasma in the gas jet. These discharges can be either in a continuous mode, or in a pulsed mode. For example, in some embodiments, use of continuous discharges, such as an arc discharge or a glow discharge, is effective. However, use of this type of discharge for cracking heavy hydrocarbons may be limited by the fact that heating of the gaseous medium by continuous current may lead to undesirable increases in the temperature inside the discharge chamber. Such increases in temperature may lead to increased coking and soot production. Further, where a continuous discharge is used, the hydrocarbon fraction products may be continually exposed to the discharge until they pass out of the plasma. In contrast, the use of a pulsed discharge, particularly pulsed spark discharge, may be desirable for the purpose of light hydrocarbon fraction production from heavy oil fractions, because the interval between pulses may allows for termination of the free radicals and allow time for the product light hydrocarbons to exit the plasma.

In another aspect, an apparatus is provided for the conversion of a liquid hydrocarbon medium to a hydrocarbon fraction product. The apparatus may include a discharge chamber for housing the elements to provide a spark discharge for causing the conversion. The discharge chamber, and hence the apparatus, may include an inlet configured to convey the liquid hydrocarbon material to the discharge chamber, an outlet configured to convey a hydrocarbon fraction product from the discharge chamber, a negative electrode having a first end and a second end, and a positive electrode having a first end and a second end. In the discharge chamber, the first end of the negative electrode may be spaced apart from the first end of the positive electrode by a distance, the distance defining an inter-electrode discharge gap. To provide for a manner of mixing of the liquid hydrocarbon material with a carrier gas, as described above, the discharge chamber may also include a gas jet configured to introduce the carrier gas proximally to the discharge gap. In other words, the carrier gas may be injected into the liquid hydrocarbon material at, or just prior to, injection into the discharge gap. The second end of the negative electrode and the second end of the positive electrode may be connected to a capacitor, and a power supply may be provided and configured to generate the spark discharge in the inter-electrode discharge gap.

In the discharge chamber, a spark discharge may be formed in the inter-electrode discharge gap when the voltage (V) applied to the electrodes is equal to, or greater than, the breakdown voltage ($V_b$) of the inter-electrode gap. The spark discharge may be initiated by free electrons, which usually appear on the positive electrode by field emission or by other processes of electron emission. The free electrons may be accelerated into the electric field spanning the gap, and a spark plasma channel may be generated as the gas in the gap is ionized. After forming a spark discharge channel, a current of discharge may flow through the plasma. The voltage within the plasma channel ($V_d$) may be lower than the breakdown voltage ($V_b$). An arc discharge may be generated if the power supply is sufficient for the current in the discharge channel to flow in a continuous mode. The heating of the plasma may also occur in the spark discharge. However, the temperature can be controlled not only by adjusting the intensity of the discharge current, but also by controlling the duration of the discharge. In certain embodiments, as a result of the plasma channel created in the gas, the gas temperature can reach several thousand ° C.

Alternatively, a different power scheme may be used to generate the spark discharge. In some embodiments, a large variety of different pulse generators may be used to ignite the spark discharges. For example, a circuit discharging a pre-charge storage capacitor on load may be used. The parameters of the pulse voltage at the load are determined by the storage capacity as well as the parameters of the whole of the discharge circuit. The energy losses will depend on the characteristics of the discharge circuit, in particular loss into the switch.

In some embodiments of the present technology, a spark switch may be directly used as the load, i.e., plasma reactor, thereby reducing energy losses in the discharge circuit. Further, the storage capacitor can be connected in parallel to the spark gap on the circuit with minimum inductance. The breakdown of the gap may occur when the voltage on storage capacitor reaches the breakdown voltage, and the energy input into the plasma spark may occur during the discharge of the capacitor. Consequently, energy losses in the circuit are low.

According to various embodiments, the positive and negative electrodes may be shaped as flat electrodes, either as a sheet, a blade, or a flat terminal, and/or as tube-shaped electrodes (i.e. cannulated). A cannulated electrode is a hollow electrode through which the carrier gas may be injected into the liquid hydrocarbon material at the inter-electrode gap. Thus, a cannulated electrode may serve as a conduit for the carrier gas. Where the negative electrode is cannulated, the passage of the cannula may have a radius of curvature at the opening of the tube. The height or length of discharge electrode is usually measured from the base that is the point of attachment, to the top. In some embodiments, the ratio of the radius of curvature to the height or length of the cathode can be greater than about 10.

As noted above, the inter-electrode discharge gap, i.e. the distance between the two electrodes, influences the efficiency of the process. The inter-electrode discharge gap is a feature that is amenable to optimization based upon, for example, the particular hydrocarbon material fed to the discharge chamber, the injected carrier gas, and the applied voltage and/or current. However, some ranges for the inter-electrode discharge gap may be set forth. For example, in any of the above embodiments, the inter-electrode discharge gap may be from about 1-3 to about 100 millimeters. This may include an inter-electrode discharge gap from about 3 to about 20 millimeters, by using the operating voltage of 30-50 kV the optimum gap length will be 8 to 12 millimeters. The negative electrode and the positive electrode may both project into the discharge chamber.

As noted, the storage capacitor may be charged to a voltage equal to, or greater than, the breakdown voltage of the carrier gas, such that a spark discharge is produced. In some embodiments, the discharge occurs between the positive electrode and the carrier gas proximal to the first end of the positive electrode. In some embodiments, the discharge is continuous. In other embodiments, the discharge is pulsed. In some embodiments, the rate of electric discharge is regulated by the value of resistance in the charging circuit of the storage capacitor.

A power supply may be connected to the entire system to provide energy input for driving the discharge. In some embodiments, a DC power supply with an operating voltage of 15-25 kV can be used in the device described herein. The power source may depend on the number of gaps for processing of hydrocarbon liquid, on their length, pulse repetition rate, liquid flow rate through the reactor, the gas flow rate through each gap, etc. An example of a device that uses 12 gaps may include a reactor which utilizes discharge gaps of 3.5 mm length, capacitors by 100 pF capacity, operating voltage 18 kV and a pulse repetition rate of 5 Hz. The power supply consumed can range from 1 to 2 watts, while the plasma can absorb a power of about 0.97 watts directly in the discharge. The remaining energy may be dissipated in the charging system capacitors.

Embodiments of the apparatuses and processes thus generally described above, may be better understood by reference to the following examples, which are not intended to be limiting of the apparatuses or processes described above in any manner.

EXAMPLES

Example 1: T+4CWG: Step-Up Transformer ($P_{max}$=900 W) Powering Four (4) half-wave CWGs in parallel across four (4) air gaps of similar breakdown voltage To demonstrate the aforementioned capability of the T+CWG setup to efficiently power several spark gaps off of a single line input, the circuit shown in FIG. 8 was constructed and assessed using a pulse energy measurement diagnostic method in order to calculate efficiency. By quantifying the charge transferred during a single spark event using the subcircuit shown on the fourth spark gap of FIG. 8, pulse energy can be estimated for individual spark events. This method was used to generate pulse energy and frequency statistics (FIG. 12), from which average energy output was calculated. Taking into account power calculations for the diagnostic equipment (high-voltage probe, charge measurement subcircuit) as well as the differential power output from the transformer $$\frac{dP_w}{dN_{CWG}}$$

(where $P_w$ is me input wall power and $N_{CWG}$ is the number of CWG spark discharge circuits operating in parallel), a differential efficiency value of the FIG. 5 circuit was defined to be $$\eta_A = \frac{P_{out} - P_{probe} - P_{RQ}}{(dP_w/dN_{CWG})}$$

where $$P_{out} = E_{pulse,avg} f_{avg}, \; P_{probe} = \frac{V_{gap,avg}^2}{R_{probe}}, \text{ and } P_{RQ} = \frac{V_{,avg}^2}{R_{probe}}.$$

These results have been tabulated in Table 3 and plotted in FIG. 12. An average differential efficiency value of $\eta_A=68.3\%$ was found. An alternate differential efficiency definition for this circuit is $$\eta_B = \frac{d(P_{out} + P_{probe} + P_{RQ})}{dP_w},$$

which represents the incremental increase in usable output power for an incremental increase in input power. The aforementioned data (detailed in Table 3) is sufficient for plotting $P_{out}+P_{probe}+P_{RQ}$ as a function of $P_w$, as shown in FIG. 13. This plot is strongly linear, and $\eta_B$ can be calculated by finding the average slope of this data via linear regression. This results in a differential efficiency value of $\eta_B=64.9\%$, which is in good agreement with the calculation for $\eta_A$ when considering experimental uncertainty. Based on these efficiency calculations, it is reasonable to conclude that this circuit meets the aforementioned requirements and would be sufficient if applied to hydrogen conversion in the manner stated above.

Example 2: T+CWG(FW): Step-Up Transformer ($P_{max}$=900 W) Powering a Full-Wave CWG Across an Air Gap Similar to the experiment detailed in Example 1, an efficiency analysis was carried out for a single full-wave CWG spark gap system in air, in order to compare efficiencies between the full-wave and half-wave T+CWG schemes. Results from this analysis (FIGS. 15 and 16) are directly comparable to the half-wave circuit results detailed in FIGS. 9 and 13 using the differential efficiency definition $$\eta_B = \frac{d(P_{out} + P_{probe} + P_{RQ})}{dP_w};$$

a differential efficiency of $\eta_B=70.9\%$ was calculated for the full-wave T+CWG case. This result shows that the difference in differential efficiency between the full-wave circuit (FIG. 14) and the half-wave circuit is minor (<5%).

The invention is further defined by the following embodiments:

Embodiment A. An apparatus comprising: an oil treatment reactor for receiving a two-phase mixture of gas and liquid, wherein the mixture includes a hydrocarbon to be converted; a multi-electrode spark discharge circuit for hydrocarbon conversion, the spark discharge circuit having two or more spark gap electrodes exposed to the two-phase mixture in the oil treatment reactor; and at least one high-voltage rectifier circuit operatively coupled to the spark discharge circuit; wherein the apparatus is configured to supply a power-controlled input to the spark discharge circuit in generating discharge sparks across the electrodes.

Embodiment B. The apparatus of Embodiment A, wherein the rectifier circuit is configured to generate a higher DC voltage from a lower-voltage AC input.

Embodiment C. The apparatus of Embodiment A or B, wherein the rectifier circuit includes at least one Cockcroft-Walton generator (CWG).

Embodiment D. The apparatus of any of Embodiments A-C, wherein the rectifier circuit operates in parallel off of a step-up transformer.

Embodiment E. The apparatus of any of Embodiments A-D, wherein the line input is at least one of a 120 VAC 60 Hz input and a 240 VAC 60 Hz input.

Embodiment F. The apparatus of any of Embodiments A-E, wherein a single step-up transformer powers multiple spark gaps in parallel.

Embodiment G. The apparatus of any of Embodiments A-F, the apparatus having multiple transformers and multiple spark gaps, with one transformer for each spark gap, and with full electrical separation of each spark gap circuit.

Embodiment H. The apparatus of any of Embodiments A-G, wherein the rectifier circuit includes a CWG, and wherein the step-up transformer is connected to a multi-phase line input so as to separate the differently-phased input AC voltages and attach one or more full CWG transformer setups to each input.

Embodiment I. The apparatus of any of Embodiments A-H, wherein the rectifier circuit includes a half-wave single-stage CWG.

Embodiment J. The apparatus of any of Embodiments A-I, wherein the rectifier circuit includes a multi-stage CWG.

Embodiment K. The apparatus of any of Embodiments A-J, wherein the rectifier circuit includes a full-wave CWG.

Embodiment L. The apparatus of any of Embodiments A-K, wherein a capacitance of at least one of the capacitors in the rectifier circuit affects energy per pulse for discharge sparks.

Embodiment M. The apparatus of any of Embodiments A-L, wherein the rectifier circuit operates in parallel with a first power supply and a second power supply operating in conjunction with the first power supply, wherein the first power supply converts a standard AC line input to low-voltage DC output, and wherein the second power supply converts low-voltage DC input to high-voltage AC output at any frequency.

Embodiment N. The apparatus of any of Embodiments A-M, wherein the rectifier circuit is configured to have an output capacitance ranging from 1 pF to 1 nF, potentially taking advantage of any inherent stray capacitance of the circuit.

Embodiment O. The apparatus of any of Embodiments A-N, the apparatus being configured to generate a voltage ranging from 3 kV to 50 kV.

Embodiment P. An apparatus comprising: a treatment reactor for receiving a mixture to be treated; at least one multi-electrode spark discharge circuit, the at least one spark discharge circuit being implemented in the treatment reactor by exposing the two spark gap electrodes to the mixture; and at least one high-voltage generator operatively coupled to the at least one spark discharge circuit, the generator being configured to supply a current-controlled input to the at least one spark discharge circuit in generating discharge sparks across the electrodes.

Embodiment Q. The apparatus of Embodiment P, wherein the generator is a Cockcroft-Walton generator (CWG) operatively coupled to the spark discharge circuit, the CWG being configured to operate in parallel off of a step-up transformer.

Embodiment R. The apparatus of Embodiment P or Q, configured for decontamination of at least one of food and water.

Embodiment S. A hydrocarbon conversion apparatus comprising: a discharge chamber having two or more electrodes separated by a gap; a discharge circuit configured to generate a discharge between the electrodes; an inlet for conveying a hydrocarbon material to the discharge chamber such that hydrocarbon material reaches the gap between the electrodes; an outlet for conveying a hydrocarbon fraction from the discharge chamber, the hydrocarbon fraction formed following a discharge across the electrodes while hydrocarbon material is situated in the gap; and a voltage multiplier configured to provide a current-controlled input to the discharge circuit in applying electrical pulses to the hydrocarbon material via the electrodes.

Embodiment T. The apparatus of Embodiment S, wherein the voltage multiplier is a Cockcroft-Walton generator.

Embodiment U. The apparatus of Embodiment S or T, wherein the Cockcroft-Walton generator is a single-stage Cockcroft-Walton generator.

Embodiment V. The apparatus of any of Embodiments S-U, wherein the Cockcroft-Walton generator is a multi-stage Cockcroft-Walton generator.

Embodiment W. The apparatus of any of Embodiments S-V, wherein the Cockcroft-Walton generator is a half-wave Cockcroft-Walton generator.

Embodiment X. The apparatus of any of Embodiments S-W, wherein the Cockcroft-Walton generator is a full-wave Cockcroft-Walton generator.

Embodiment Y. The apparatus of any of Embodiments S-X, wherein the Cockcroft-Walton generator is configured to generate high-voltage capacitor-discharging pulses for hydrocarbon conversion.

Embodiment Z. The apparatus of any of Embodiments S-Y, further including a step-up transformer.

Embodiment AA. The apparatus of any of Embodiments S-Z, wherein the apparatus is powered using a high-voltage AC power source.

Embodiment BB. The apparatus of any of Embodiments S-AA, wherein the voltage multiplier is a first voltage multiplier, and wherein the apparatus further includes a second voltage multiplier configured to operate in parallel with the first voltage multiplier.

Embodiment CC. The apparatus of any of Embodiments S-BB, further including a step-up transformer operatively coupled to both the first voltage multiplier and the second voltage multiplier, wherein the first and second voltage multipliers are operatively coupled to a single step-up transformer.

Embodiment DD. The apparatus of any of Embodiments S-CC, wherein the apparatus is powered using direct line power input.

Embodiment EE. A hydrocarbon conversion apparatus comprising: a. a discharge chamber; b. an inlet for conveying a hydrocarbon material to the discharge chamber; c. an outlet for conveying a hydrocarbon fraction from the discharge chamber; and d. a plurality of voltage multipliers operating in parallel, wherein the plurality of voltage multipliers are configured to apply electrical pulses to the hydrocarbon material in the discharge chamber for hydrocarbon conversion, wherein the electrical pulses are applied via a discharge circuit supplied with a current-controlled input.

Embodiment FF. The apparatus of Embodiment EE, wherein the plurality of voltage multipliers are Cockcroft-Walton generators.

Embodiment GG. The apparatus of Embodiment EE or FF, wherein the plurality of voltage multipliers operate in parallel off of a single step-up transformer.

Embodiment HH. A hydrocarbon conversion method comprising: a. conveying, via an inlet, a hydrocarbon material to a discharge chamber; b. using one or more Cockcroft-Walton generators to apply high-voltage capacitor-discharging electrical pulses to the hydrocarbon material in the discharge chamber for hydrocarbon conversion, wherein the pulses are applied via a two-electrode spark discharge circuit supplied with a current-controlled input; and c. conveying, via an outlet, a hydrocarbon fraction from the discharge chamber.

Embodiment II. The method of Embodiment HH, wherein using the one or more Cockcroft-Walton generators comprises using a plurality of voltage multipliers operating in parallel.

Embodiment JJ. The method of Embodiment HH or II, wherein the Cockcroft-Walton generators are part of an apparatus that is powered by a step-up transformer using direct line power input.

Embodiment KK. A system comprising of a single-stage half-wave Cockcroft-Walton generator used to generate high-voltage capacitor-discharging pulses for hydrocarbon conversion, powered by a step-up transformer using direct line power input.

Embodiment LL. A system comprising of a collection of single stage half-wave Cockcroft-Walton generators operating in parallel off of a single step-up transformer using direct line power input for use in hydrocarbon conversion.

Embodiment MM. A system comprising of a single-stage full-wave Cockcroft-Walton generator used to generate high-voltage capacitor-discharging pulses for hydrocarbon conversion, powered by a step-up transformer using direct line power input.

Embodiment NN. A system comprising of a collection of single stage full-wave Cockcroft-Walton generators operating in parallel off of a single step-up transformer using direct line power input for use in hydrocarbon conversion.

Embodiment OO. A system comprising of a multi-stage half-wave Cockcroft-Walton generator used to generate high-voltage capacitor-discharging pulses for hydrocarbon conversion, powered by a step-up transformer using direct line power input.

Embodiment PP. A system comprising of a collection of multi-stage half-wave Cockcroft-Walton generators operating in parallel off of a single step-up transformer using direct line power input for use in hydrocarbon conversion.

Embodiment QQ. A system comprising of a multi-stage half-wave Cockcroft-Walton generator used to generate high-voltage capacitor-discharging pulses for hydrocarbon conversion, powered by a step-up transformer using a high-voltage AC power source.

Embodiment RR. A system comprising of a collection of multi-stage half-wave Cockcroft-Walton generators operating in parallel off of a single step-up transformer using a high-voltage AC power source for use in hydrocarbon conversion.

For the purposes of this disclosure and unless otherwise specified, "a" or "an" means "one or more."

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The embodiments, illustratively described herein may suitably be practiced in the absence of any element or elements, limitation or limitations, not specifically disclosed herein. Thus, for example, the terms 'comprising', 'including,' 'containing,' etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase 'consisting essentially of' will be understood to include those elements specifically recited and those additional elements that do not materially affect the basic and novel characteristics of the claimed technology. The phrase 'consisting of' excludes any element not specified.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and processes within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular processes, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as 'up to,' 'at least,' 'greater than,' 'less than,' and the like, include the number recited and refer to ranges which can be subsequently broken down into sub-ranges as discussed above. Finally, as will be understood by one skilled in the art, a range includes each individual member.

While certain embodiments have been illustrated and described, it should be understood that changes and modifications can be made therein in accordance with ordinary skill in the art without departing from the technology in its broader aspects as defined in the following claims.

What is claimed is:

1. An apparatus comprising:
    an oil treatment reactor for receiving a two-phase mixture of gas and liquid, wherein the mixture includes a hydrocarbon to be converted; and
    a multi-electrode spark discharge circuit for hydrocarbon conversion, the spark discharge circuit having spark gap electrodes defining multiple spark discharge gaps exposed to the two-phase mixture in the oil treatment reactor;
    wherein the apparatus is configured to supply a current-controlled input to the spark discharge circuit to generate discharge sparks across the electrodes that define the multiple spark discharge gaps; and
    wherein the spark discharge circuit comprises a Cockcroft-Walton subcircuit for each of the multiple spark discharge gaps, the Cockcroft-Walton subcircuits being configured to generate a higher DC voltage from a lower-voltage AC input.

2. The apparatus of claim 1, wherein the spark-discharge circuit is configured to generate the higher DC voltage from the lower-voltage AC input without a resistive element so as to reduce ohmic heating.

3. The apparatus of claim 1, wherein each Cockcroft-Walton subcircuit includes at least one Cockcroft-Walton generator (CWG).

4. The apparatus of claim 2, wherein the spark discharge circuit operates in parallel off of a step-up transformer.

5. The apparatus of claim 4, wherein the step-up transformer is connected to a single-phase line input.

6. The apparatus of claim 5, wherein the line input is at least one of a 120 VAC 60 Hz input and a 240 VAC 60 Hz input.

7. The apparatus of claim 4, wherein a single step-up transformer powers multiple spark gaps in parallel.

8. The apparatus of claim 4, the apparatus having multiple transformers and multiple spark gaps, with one transformer for each spark gap, and with full electrical separation of each spark gap circuit.

9. The apparatus of claim 4, wherein the spark discharge circuit includes a CWG, and wherein the step-up transformer is connected to a multi-phase line input so as to separate the differently-phased input AC voltages and attach one or more full CWG transformer setups to each input.

10. The apparatus of claim 1, wherein the spark discharge circuit includes a half-wave single-stage CWG.

11. The apparatus of claim 1, wherein the spark discharge circuit includes a multi-stage CWG.

12. The apparatus of claim 1, wherein the spark discharge circuit includes a full-wave CWG.

13. The apparatus of claim 1, wherein a capacitance of at least one of the capacitors in the spark discharge circuit affects energy per pulse for discharge sparks.

14. The apparatus of claim 1, wherein the spark discharge circuit is configured to have an output capacitance ranging from 1 pF to 1 nF to take advantage of any inherent stray capacitance of the circuit.

15. The apparatus of claim 1, the apparatus being configured to generate a voltage ranging from 3 kV to 50 kV.

16. The apparatus of claim 1, wherein the spark discharge circuit is configured for pulse energies of 30 mJ or smaller in order to reduce soot production.

17. The apparatus of claim 1, wherein the Cockcroft-Walton subcircuits are powered in parallel so as to evenly distribute power output among the multiple spark discharge gaps and prevent sparking across a single spark discharge gap exclusively.

18. The apparatus of claim 1, further comprising:
an inlet for conveying the hydrocarbon to the oil treatment reactor such that the hydrocarbon reaches the multiple spark discharge gaps; and
an outlet for conveying a hydrocarbon fraction from the oil treatment reactor, the hydrocarbon fraction formed following a discharge across a pair of the spark gap electrodes while the hydrocarbon is situated between the pair of the spark gap electrodes.

\* \* \* \* \*

UNITED STATES PATENT AND TRADEMARK OFFICE
CERTIFICATE OF CORRECTION

| | | |
|---|---|---|
| PATENT NO. | : 12,116,533 B2 | Page 1 of 1 |
| APPLICATION NO. | : 17/048640 | |
| DATED | : October 15, 2024 | |
| INVENTOR(S) | : Staack et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1031 days.

Signed and Sealed this
Twenty-second Day of April, 2025

Coke Morgan Stewart
*Acting Director of the United States Patent and Trademark Office*